US011031731B2

(12) United States Patent
Montena

(10) Patent No.: US 11,031,731 B2
(45) Date of Patent: Jun. 8, 2021

(54) BREAKAWAY CONNECTORS FOR COAXIAL CABLES

(71) Applicant: PPC BROADBAND, INC., East Syracuse, NY (US)

(72) Inventor: Noah P. Montena, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 16/590,367

(22) Filed: Oct. 1, 2019

(65) Prior Publication Data

US 2020/0106215 A1    Apr. 2, 2020

Related U.S. Application Data

(63) Continuation-in-part of application No. 15/269,963, filed on Sep. 19, 2016, now Pat. No. 10,431,929, (Continued)

(51) Int. Cl.
 *H01R 13/635* (2006.01)
 *H01R 13/58* (2006.01)
 (Continued)

(52) U.S. Cl.
 CPC ......... *H01R 13/635* (2013.01); *H01R 9/0503* (2013.01); *H01R 13/5804* (2013.01);
 (Continued)

(58) Field of Classification Search
 CPC .............. H01R 13/5804; H01R 13/635; H01R 13/6392; H01R 9/0503; H01R 24/40; H02G 7/04; H02G 7/18
 See application file for complete search history.

(56) References Cited

U.S. PATENT DOCUMENTS

| 3,953,098 A | * | 4/1976 | Avery | .................. | H01R 13/635 |
| | | | | | 439/258 |
| 5,315,064 A | * | 5/1994 | Andrews | .............. | H01R 13/633 |
| | | | | | 174/40 R |

(Continued)

OTHER PUBLICATIONS

Search Report dated Sep. 4, 2020 in corresponding PCT Application No. PCT/US2020/039470, 2 pages.

(Continued)

*Primary Examiner* — Oscar C Jimenez
(74) *Attorney, Agent, or Firm* — MH2 Technology Law Group LLP

(57) ABSTRACT

A breakaway coaxial cable connector includes a conductive body configured to engage a cable. The conductive body is configured to be selectively coupled to an interface port to maintain electrical connectivity between the cable and the interface during operation of the connector when a first tension force below a predetermined threshold level is applied between the cable and the interface port, and the conductive body is configured to be selectively de-coupled from the interface port so as to interrupt electrical connectivity between the cable and the interface port during operation of the connector when a second tension force above the predetermined threshold level is applied between the cable and the interface port.

20 Claims, 30 Drawing Sheets

Related U.S. Application Data which is a continuation of application No. 14/860,635, filed on Sep. 21, 2015, now Pat. No. 9,450,333.

(60) Provisional application No. 62/865,846, filed on Jun. 24, 2019, provisional application No. 62/877,306, filed on Jul. 22, 2019, provisional application No. 62/052,512, filed on Sep. 19, 2014, provisional application No. 62/052,516, filed on Sep. 19, 2014.

(51) Int. Cl.
| | |
|---|---|
| *H02G 7/04* | (2006.01) |
| *H02G 7/18* | (2006.01) |
| *H01R 24/40* | (2011.01) |
| *H01R 9/05* | (2006.01) |
| *H01R 107/00* | (2006.01) |
| *H01R 13/639* | (2006.01) |
| *H01R 101/00* | (2006.01) |

(52) U.S. Cl.
CPC .............. *H01R 24/40* (2013.01); *H02G 7/04* (2013.01); *H02G 7/18* (2013.01); *H01R 13/6392* (2013.01); *H01R 2101/00* (2013.01); *H01R 2107/00* (2013.01)

(56) References Cited

U.S. PATENT DOCUMENTS

| | | | | |
|---|---|---|---|---|
| 5,435,745 A | * | 7/1995 | Booth | H01R 9/0521 439/583 |
| 5,620,340 A | | 4/1997 | Andrews | |
| 5,664,968 A | | 9/1997 | Mickievicz | |
| 6,116,926 A | | 9/2000 | Ortega et al. | |
| 6,184,460 B1 | | 2/2001 | Bertoncini | |
| 6,220,896 B1 | | 4/2001 | Bertoncini et al. | |
| 7,381,092 B2 | | 6/2008 | Nakada | |
| 7,669,633 B2 | | 3/2010 | Berger | |
| 8,491,333 B2 | * | 7/2013 | Evans | H01R 9/05 439/578 |
| 9,450,333 B2 | | 9/2016 | Hanson et al. | |
| 2007/0212922 A1 | * | 9/2007 | Montena | H01R 13/6277 439/352 |
| 2008/0108242 A1 | * | 5/2008 | Wu | H01R 13/6277 439/345 |
| 2008/0254677 A1 | * | 10/2008 | Amidon | H01R 13/6584 439/583 |
| 2012/0252282 A1 | * | 10/2012 | Maki | H01R 13/639 439/784 |
| 2014/0322969 A1 | * | 10/2014 | Palinkas | H01R 9/0527 439/578 |
| 2016/0308307 A1 | * | 10/2016 | Wu | H01R 13/6275 |
| 2018/0358743 A1 | * | 12/2018 | Gruber | H01R 13/6277 |

OTHER PUBLICATIONS

Written Opinion dated Sep. 4, 2020 in corresponding PCT Application No. PCT/US2020/039470, 4 pages.

* cited by examiner

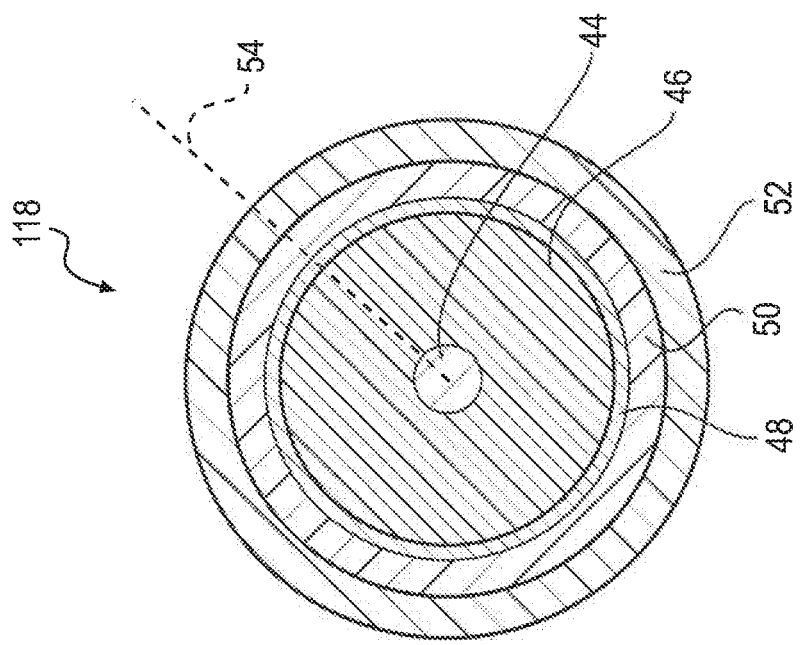
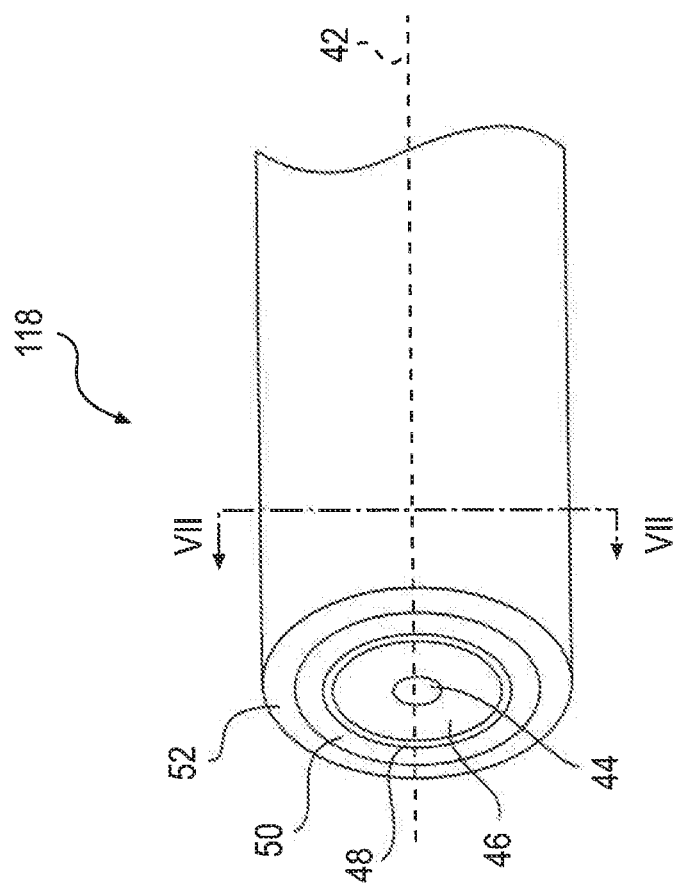

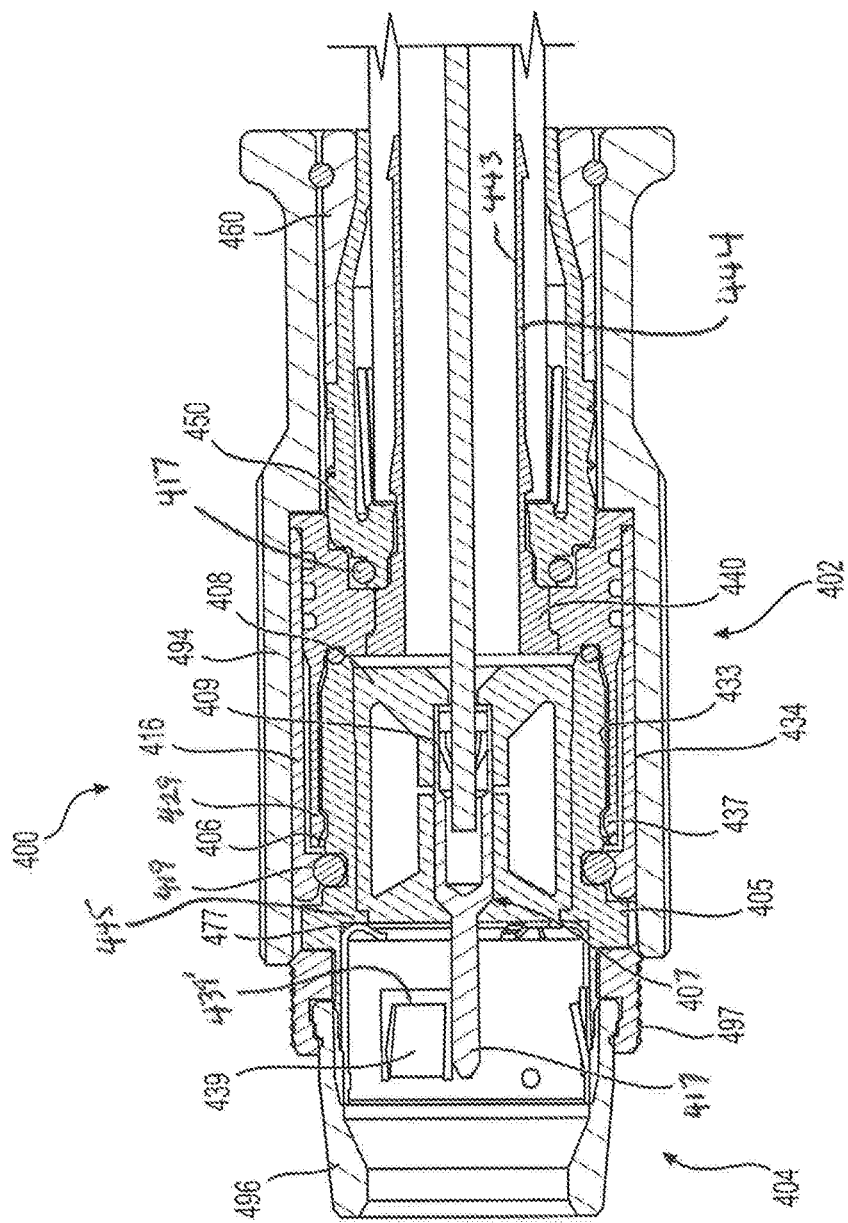
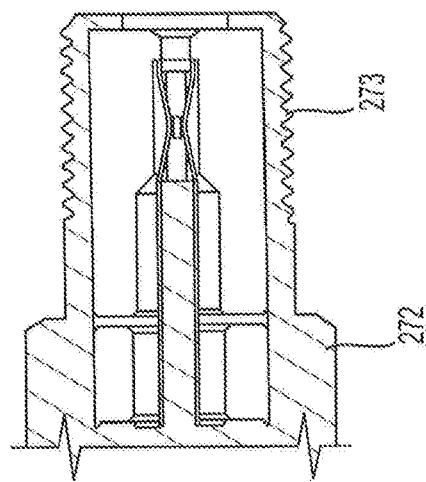
FIG. 23

BREAKAWAY CONNECTORS FOR COAXIAL CABLES

CROSS-REFERENCE TO RELATED APPLICATIONS

This is a Continuation-in-Part of U.S. application Ser. No. 15/269,963 filed Sep. 19, 2016, which in turn is a continuation of U.S. application Ser. No. 14/860,635, filed on Sep. 21, 2015, now U.S. Pat. No. 9,450,333, which is a nonprovisional application that claims the benefit of priority of U.S. Provisional Application No. 62/052,512, filed on Sep. 19, 2014, and U.S. Provisional Application No. 62/052,516, filed on Sep. 19, 2014, the disclosures of which are incorporated herein by reference in their entirety. This nonprovisional application also claims the benefit of U.S. Provisional Application No. 62/865,846, filed Jun. 24, 2019, and U.S. Provisional Application No. 62/877,306, filed Jul. 22, 2019, the disclosures of which are incorporated herein by reference in their entirety.

In addition, the entire contents of the following applications are hereby incorporated into this application by reference: (a) U.S. patent application Ser. No. 14/725,146, filed on May 29, 2015; (b) U.S. patent application Ser. No. 14/725,548, filed on May 29, 2015, and (c) U.S. patent application Ser. No. 14/860,627, filed on Sep. 21, 2015.

BACKGROUND

Coaxial cable is known to be routed above and below ground between utility poles and a mounting structure of a subscriber's home/office environment, as well as between two end points with the subscriber's home/office environment. The aerial cable extends between an interface port or some other connection at each end. If the cable is struck by a tensile load about a threshold level, the tensile load transmitted into the interface port or other connection can result in damage to the interface port, the support structure, connected electronic equipment, or the cable itself. In such situations, damage to the cable, the interface port, and/or the support structure often results in loss of service, requiring time to schedule, investigate, and perform the requisite repairs. If essential services are provided over the cable, such as phone or Internet service, a loss of service of more than a few hours may be entirely unacceptable. Further, damage to electronic equipment can be extremely costly to repair or replace.

Therefore, there is a need to overcome, or otherwise lessen the effects of, the disadvantages and shortcomings described above.

SUMMARY

In accordance with various aspects of the disclosure, a breakaway coaxial cable connector includes a conductive body configured to engage a cable. The conductive body is configured to be selectively coupled to an interface port to maintain electrical connectivity between the cable and the interface during operation of the connector when a first tension force below a predetermined threshold level is applied between the cable and the interface port, and the conductive body is configured to be selectively de-coupled from the interface port so as to interrupt electrical connectivity between the cable and the interface port during operation of the connector when a second tension force above the predetermined threshold level is applied between the cable and the interface port.

According to various aspects of the disclosure, a breakaway connector includes a body member configured to engage a cable. The body member is configured to be selectively coupled to an interface port so as to maintain electrical connectivity between the cable and the interface port during operation of the connector when a first tension force below a predetermined threshold level is applied between the cable and the interface port, and the body member and the interface port are configured to be selectively de-coupled from each other so as to interrupt electrical connectivity between the cable and the interface port during operation of the connector when a second tension force above the predetermined threshold level is applied between the cable and the interface port.

BRIEF DESCRIPTION OF THE DRAWINGS

Features and advantages of the present disclosure are described in, and will be apparent from, the following Brief Description of the Drawings and Detailed Description.

FIG. 6 is an isometric view of one embodiment of a coaxial cable which is configured to be operatively coupled to a data network.

FIG. 7 is a cross-sectional view of the cable of FIG. 6, taken substantially along line VII-VII.

FIG. 23 is a cross-sectional view of the exemplary snap connector of FIG. 20.

DETAILED DESCRIPTION

Figure 1:
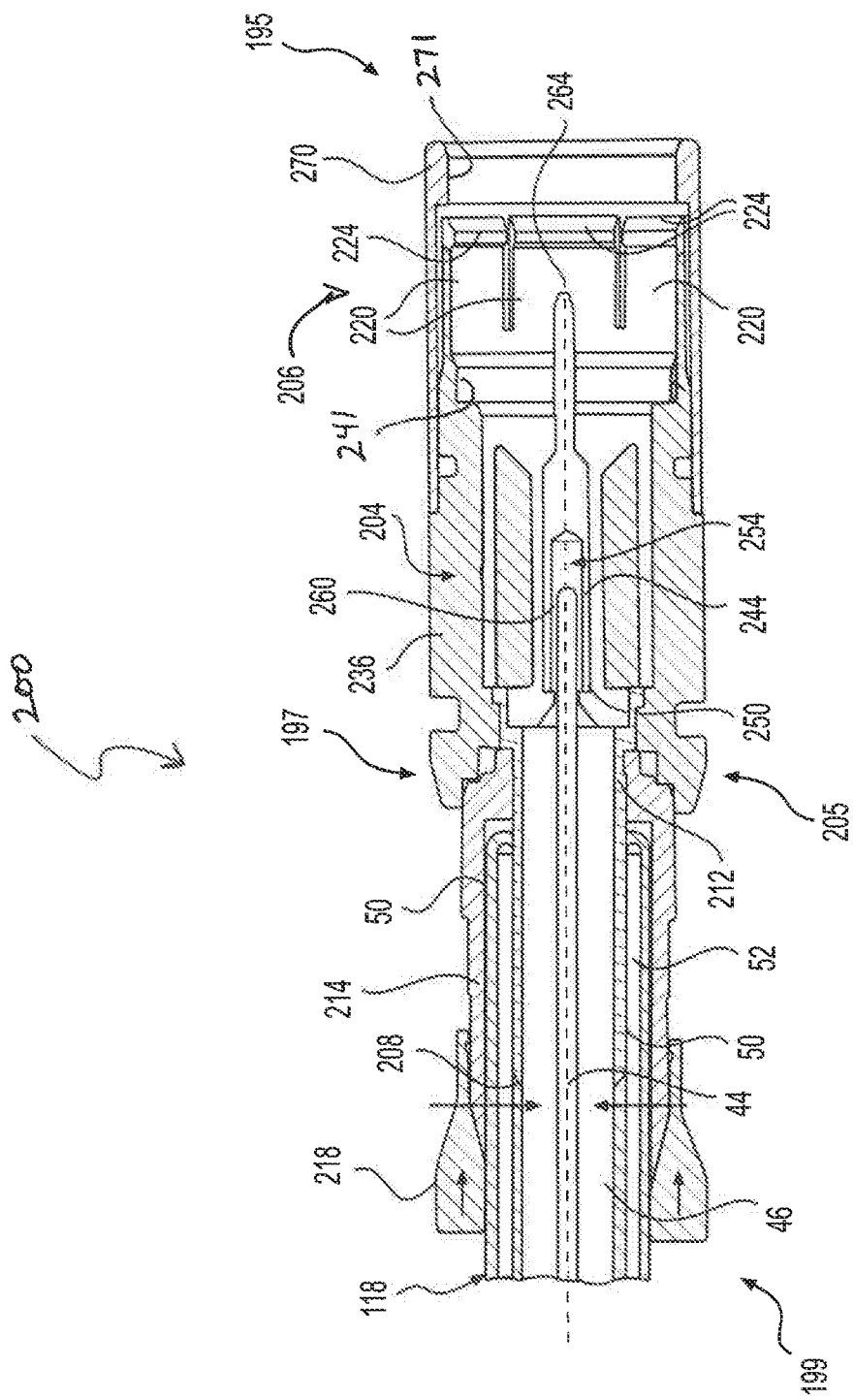
FIG. 1 is a cross-sectional view of an exemplary breakaway connector according to various aspects of the disclosure.

According to embodiments of the disclosure, a breakaway connector is provided for preventing damage to the structural components of a cable, for example, a coaxial cable, spanning a distance between two end points, for example, between two interface ports. In some aspects, the coaxial cable may span an aerial distance from a utility pole to a home/residence or other building structure.

As shown in FIGS. 1-5, a breakaway connector 200 comprises an outer body 214, a conductive tubular post 212 disposed at least partially within the outer body 214, and a coupler portion 204. The conductive post 212 may include a barbed rearward end 208. Tapered end fasteners 218 may be disposed at a rearward end 199 of the outer body 214. The coupler portion 204 has a first end 205 coupled to a proximal end 197 of the connector body 214 and a second end 206 configured to be coupled with an interface port 272 of any electronic device 274, such as for example, a splitter, an amplifier, a cable/satellite box, a television, or the like.

The cable 118 is prepared in a manner described in more detail below with reference to FIGS. 6-10. That is, an outer jacket 52 and an inner dielectric core 46 of the cables 118 are stepped/spliced to expose an outer braided conductor 50 and an inner aluminum conductor 44. The outer braided conductor 50 is folded back over the outer jacket 52 to facilitate the insertion of the barbed end 208 of the conductive tubular post 212. More specifically, the folded end portion of the braided conductor 50 is inserted between the tubular post 212 and the outer body 214 such that the tapered end fastener 218 may be displaced axially, toward the second end 206 of the coupler portion 204. Axial displacement of the tapered end fastener 218 toward the second end 206 compresses the outer body 214 in a radially inward direction toward the barbed end 208 of the conductive tubular post 212. Compression of the outer body 214 causes the barbed end 208 to engage the braided outer conductor 50 and the outer jacket 52 such that the respective cable 118 is axially retained relative to the outer body 214 of the connector 200.

As shown in FIG. 1, the coupler portion 204 includes a conductive outer body 236 having a plurality of resilient fingers 220. Each of the resilient fingers 220 includes an arcuate lip retainer 224 that extends radially inward from the respective finger 220 and then extends radially outward. The arcuate lip retainers 224 of the resilient fingers 220 are configured to engage an external surface of the interface port 272 to couple the coupler portion 204 with the interface port 272, as described in more detail below.

The breakaway connector 200 maintains grounding and shielding conductivity with the interface port 272 through the conductive outer body 236 of the coupler portion 204. More specifically, the outer braided conductor 50 of the drop cables 118 electrically connects to the conductive tubular post 212 which, in turn, is electrically connected to the conductive outer body 236 of the coupler portion 204, which, in turn, is electrically connected to the to the interface port 272.

In some aspects, the coupler portion 204 may include a unidirectional inner conductor engager 244 at its geometric center. The unidirectional inner conductor engager 244, which is integrated with the coupler portion 204, includes a protruding inner conductor pin 264 that is configured to be received by the interface port 272. The unidirectional engager 244 may include a plurality of spring fingers 250 defining a cavity 254 for receiving a pin 260 of the inner conductor 44. It should be understood that in some embodiments, the unidirectional engager 244 may be integrated with the coupler portion 204 as a single piece of unitary construction, and in other embodiments, the unidirectional engager 244 may be a separate structure from the coupler portion 204.

As a safety precaution, the breakaway connector 200 may be configured such that the interface between the coupler portion 204 and the interface port 272 becomes, and remains, electrically engaged before and after engagement with the inner conductor 44. In the described embodiment, this may be achieved by causing the pin 260 to dislodge from the conductive spring fingers 250 and a respective cavity 254, before the outer conductor 50 disconnects from the conductive tubular posts 212 or the conductive outer body 236. Alternatively, a simple flex connector (not shown) may be employed to maintain grounding contact of the outer conductor 50. This electrical arrangement prevents hazards created by television or broadband services remaining functional (due to the continued connection of the inner conductor 44) even as the CATV system ground is disabled. This can mislead a subscriber or service technician to believe that the breakaway connector is fully functional even though electrical hazards may still be present.

The coupler portion 204 and the interface port 272 are configured to fit firmly together ensuring high RF transparency and electrical grounding, but are configured to pull apart without damage once a threshold level of tension is achieved in the cable 118. The tension threshold should be no more than the weakest of several other components, namely, the cable structure itself or any mount used to secure the cable 118 to a structure, such as a utility pole, a home/residence, or other building. Furthermore, it will be appreciated that the connector 200 should allow for some magnitude of torsional slippage without releasing, i.e., to prevent the connector 200 from releasing due to small repeated twisting of the coaxial cable.

Figure 2:
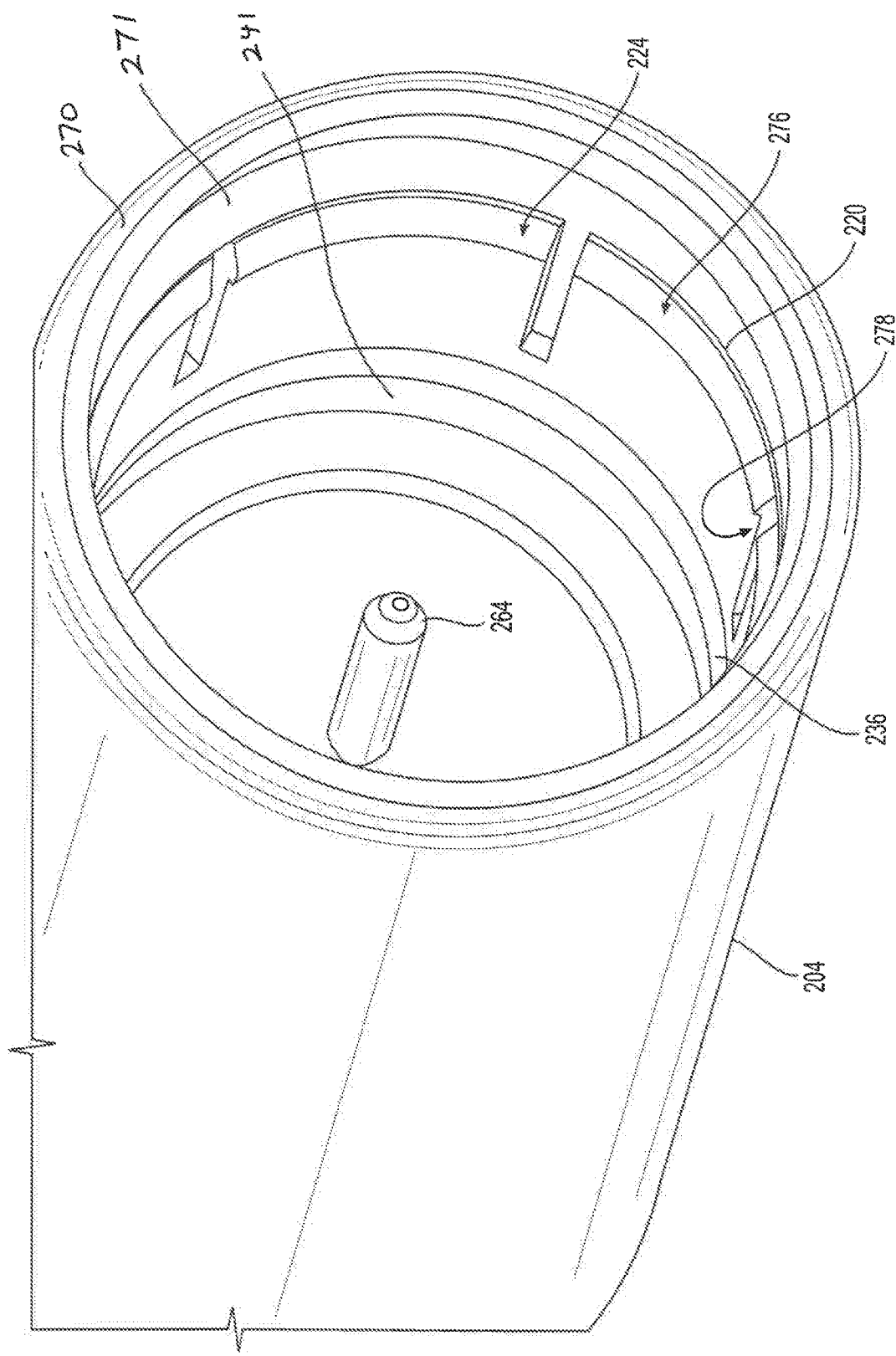
FIG. 2 is an enlarged view of the coupler portion of the exemplary breakaway connector of FIG. 1.
Figure 3:
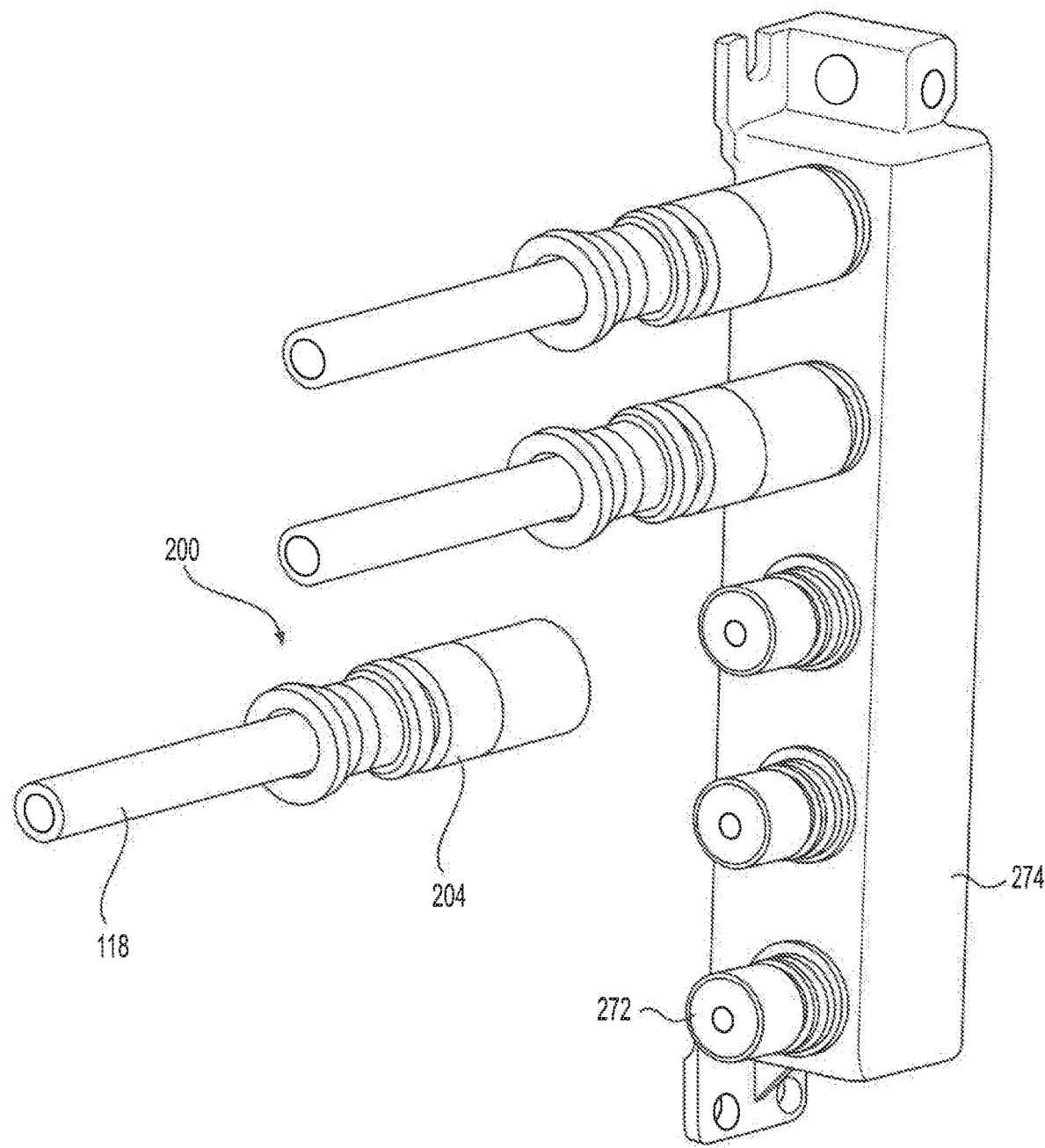
FIG. 3 is a perspective view of exemplary breakaway connectors of FIG. 1 coupled with and decoupled from an external device having a plurality of interface ports.
Figure 4:
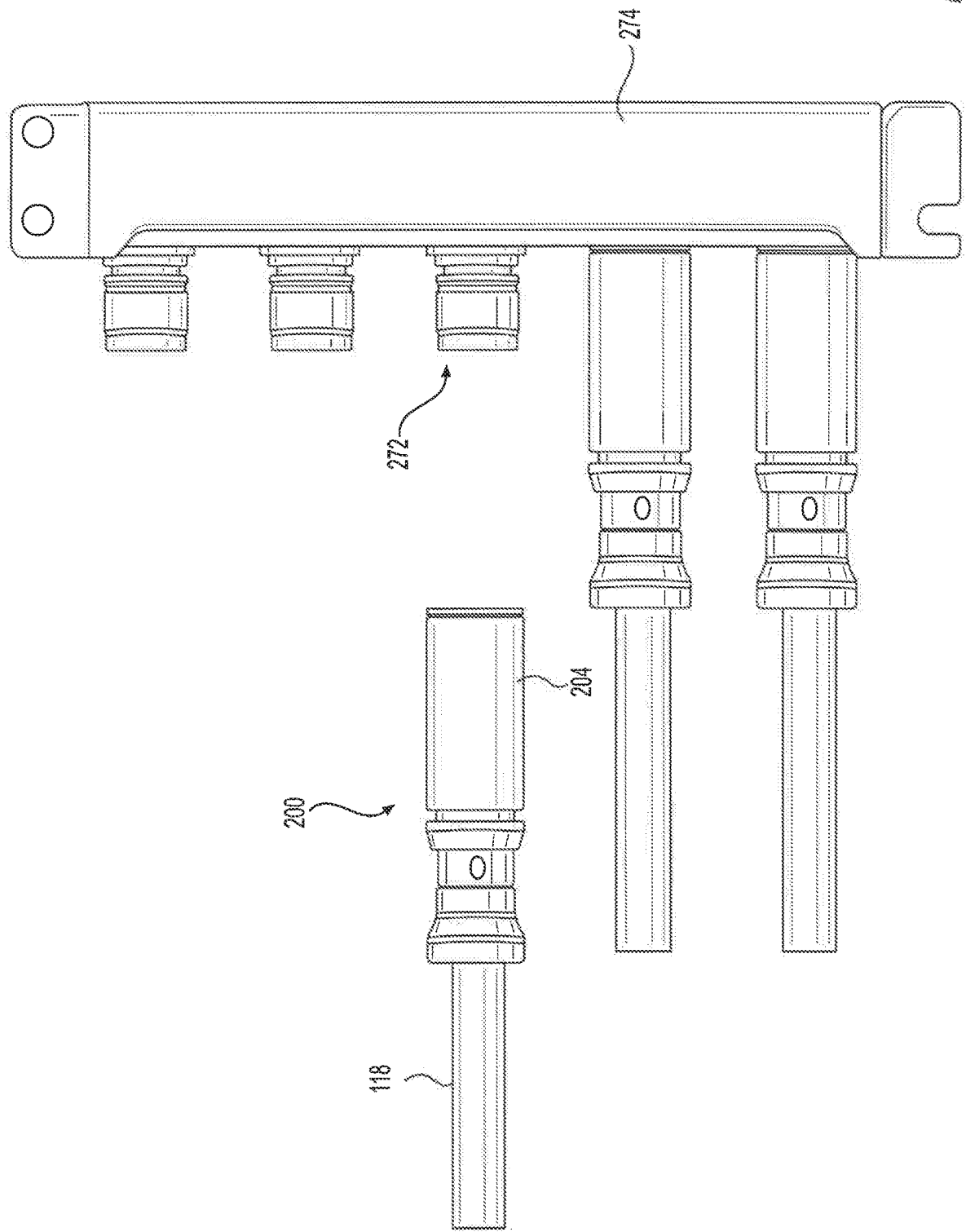
FIG. 4 is a side view of exemplary breakaway connectors of FIG. 1 coupled with and decoupled from an external device having a plurality of interface ports.

Referring now to FIGS. 2-5, in order to permit the coupler portion 204 to break away from the interface port 272, the arcuate lip retainers 224 of the resilient fingers 220 are configured to engage an external surface of an interface port 272 to couple the coupler portion 204 with the interface port 272. In particular, the arcuate lip retainers 224 include an input ramp 276 directed toward a forward end 195 of the connector 200 and an output ramp 278 directed toward the rearward end 199 of the connector 200. As illustrated in FIG. 2, the input ramps 276 are inclined at a shallower angle relative to the internal surfaces of the resilient fingers 220 in comparison with the output ramps 278, which are inclined at a steeper angle relative to the internal surfaces of the resilient fingers 220.

Figure 5:
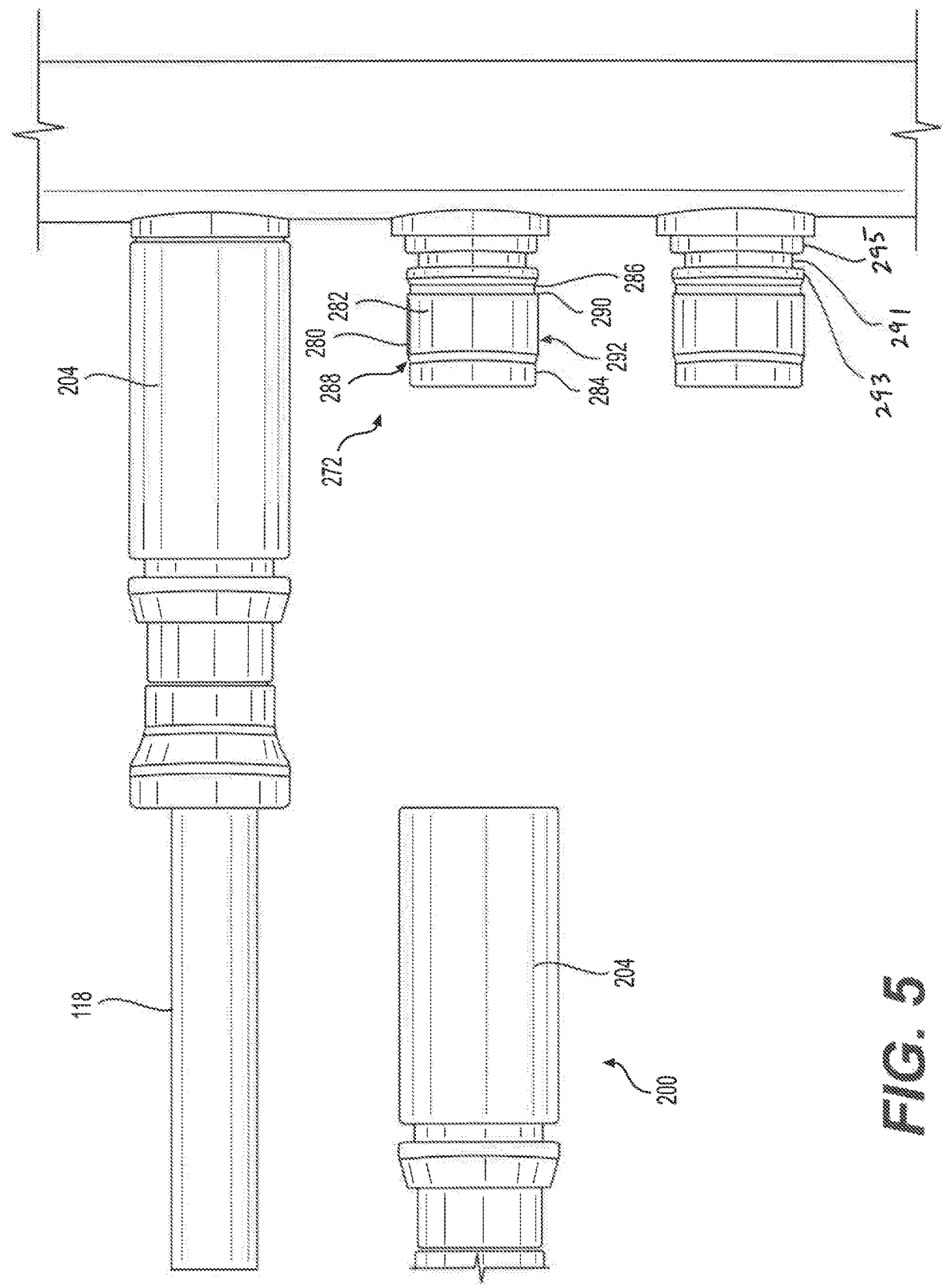
FIG. 5 is an enlarged side view of exemplary breakaway connectors of FIG. 1 coupled with and decoupled from an external device having a plurality of interface ports.

As best shown in FIG. 5, the interface port 272 includes an outer surface 280 configured to be engaged by the coupler portion 204. The outer surface 280 includes a raised annular hump 282 between a forward end 284 of the interface port 272 and a rearward annular detent 286 of the interface port 272. The raised annular hump 282 has a greater outside diameter than the forward end 284 of the interface port 272 and the rearward annular detent 286 of the interface port 272. The raised annular hump 282 includes an input ramp 288 directed toward the forward end 284 of the interface port 272 and an output ramp 290 directed toward the annular detent 286 of the interface port 272. The input ramp 288 is inclined at a shallower angle relative to the external surface 292 of the raised annular hump 282 in comparison with the output ramp 290, which is inclined at a steeper angle relative to the external surface 292 of the raised annular hump 282.

The foregoing arrangements facilitate the coupling, decoupling, recoupling of the breakaway connector 200 with the interface port 272 inasmuch as the force required to couple the connector may be less than the force required to separate the connector. For example, when the breakaway connector 200 is being connected to the interface port 272, the input ramps 276, 288 require a first level of force to move the coupler portion 204 axially relative to the interface port 272 such that the resilient fingers 220 deflect radially outward over the raised annular hump 282 and then recover to a more radially inward configuration such that the arcuate lip retainers 224 are received by the rearward annular detent 286 of the interface port 272. When the arcuate lip retainers 224 are received by the rearward annular detent 286 of the interface port 272, the output ramps 278, 290 require a second level of force, greater than the first level of force, to move the coupler portion 204 axially relative to the interface port 272 such that the resilient fingers 220 deflect radially outward over the raised annular hump 282 and the breakaway connector 200 is decoupled from the interface port 272. The second level of force is selected to be about the same as the threshold level such that the connector 200 and the interface port 272 remain interlocked until the threshold level of tension between the connector 200 and the interface port 272 is achieved. This arrangement may result in a release tension which is narrowly contained around a desired nominal value while being less sensitive to temperature variations, or the presence of oils on cooperating surfaces.

While in the described embodiment, the resilient fingers 220 are integrally formed as a single piece with the conductive body 236 of the coupler portion 204, the resilient fingers 220 may be a separate component which may be fastened, retained, or otherwise secured to the conductive body 236.

In some embodiments, the coupler portion 204 may include an assembly of a nut, for example, a threaded nut, and an coupler adaptor, for example, a threaded coupler adaptor. In such embodiments, the nut may be assembled to the prepared end of the coaxial cable, and the coupler adaptor may be threadedly coupled with the threaded nut. The threaded coupler adaptor would include the resilient fingers 220 and may include the unidirectional inner conductor engager 244.

In some embodiments, the interface port 272 may include an assembly of a threaded interface port and a port adaptor, for example, a threaded port adaptor. In such embodiments, the threaded port adaptor may be threadedly coupled with the threaded interface port. The threaded port adaptor would include the forward end 284, the raised annular hump 282, and the a rearward annular detent 286.

In any of the forgoing embodiments, the unidirectional inner conductor engager 244 may be eliminated and instead the coupler portion 204 or the nut/adapter assembly may be configured to receive the inner conductor 44 and insulator 46 such that the inner conductor 44 is positioned to be received by the interface port 272.

In some embodiments, the breakaway connector 200 includes an outer sleeve 270 disposed over the coupler portion 204. The outer sleeve 270 includes an engagement structure 271 (FIG. 1), for example, a radially inward flange, that is structured and arranged to engage rearward surfaces 293, 295 (FIG. 5) of the interface port 272. The interface port 272 may also include a groove 291 between the rearward surfaces 293, 295 that is configured to receive a seal, for example, an O-ring (not shown). In addition, when the connector 200 is coupled with the interface port 272, the contact point between the engagement structure 271 and the rearward surface 293, 295 together with a contact point between an engagement structure 241 of the coupler portion 204 and the forward end 284 of the interface port 272 provide stability between the connector 200 and the interface port 272. The outer sleeve 270 can be a metallic structure or a sturdy plastic (conductive or non-conductive) that is capable of preventing RF leakage from the slots between the fingers 220. The outer sleeve 270 may also serve to guide the connector 200 onto the interface port 272 and/or may serve to seal the surface of the forward end of the connector 200.

The breakaway connector 200 may include one or more internal seals (not shown) to prevent moisture entry when the connector 200 is separated or open to ambient weather conditions. Such internal seals may be employed in addition to at least the standard levels of moisture migration prevention when the connection is secured.

Referring to FIGS. 6-10, the coaxial cable 118 extends along a cable axis or a longitudinal axis 42. In one embodiment, the cable 118 includes: (a) an elongated center conductor or inner conductor 44; (b) an elongated insulator 46 coaxially surrounding the inner conductor 44; (c) an elongated, conductive foil layer 48 coaxially surrounding the insulator 46; (d) an elongated outer conductor 50 coaxially surrounding the foil layer 48; and (e) an elongated sheath, sleeve or jacket 52 coaxially surrounding the outer conductor 50.

The inner conductor 44 is operable to carry data signals to and from a data network (not shown). Depending upon the embodiment, the inner conductor 44 can be a strand, a solid wire or a hollow, tubular wire. The inner conductor 44 is, in one embodiment, constructed of a conductive material suitable for data transmission, such as a metal or alloy including copper, including, but not limited, to copper-clad aluminum ("CCA"), copper-clad steel ("CCS") or silver-coated copper-clad steel ("SCCCS").

The insulator 46, in one embodiment, is a dielectric having a tubular shape. In one embodiment, the insulator 46 is radially compressible along a radius or radial line 54, and the insulator 46 is axially flexible along the longitudinal axis 42. Depending upon the embodiment, the insulator 46 can be a suitable polymer, such as polyethylene ("PE") or a fluoropolymer, in solid or foam form.

In the embodiment illustrated in FIG. 7, the outer conductor 50 includes a conductive RF shield or electromagnetic radiation shield. In such embodiment, the outer conductor 50 includes a conductive screen, mesh or braid or otherwise has a perforated configuration defining a matrix, grid or array of openings. In one such embodiment, the braided outer conductor 50 has an aluminum material or a suitable combination of aluminum and polyester. Depending upon the embodiment, cable 118 can include multiple, overlapping layers of braided outer conductors 50, such as a dual-shield configuration, tri-shield configuration or quad-shield configuration.

In one embodiment, as described below, the connector 2 electrically grounds the outer conductor 50 of the coaxial cable 118. When the inner conductor 44 and external electronic devices generate magnetic fields, the grounded outer conductor 50 sends the excess charges to ground. In this way, the outer conductor 50 cancels all, substantially all or a suitable amount of the potentially interfering magnetic fields. Therefore, there is less, or an insignificant, disruption of the data signals running through inner conductor 44. Also, there is less, or an insignificant, disruption of the operation of external electronic devices near the cable 118.

In one such embodiment, the cable 118 has one or more electrical grounding paths. One grounding path extends from the outer conductor 50 to the cable connector's conductive post, and then from the connector's conductive post to the interface port 272. Depending upon the embodiment, an additional or alternative grounding path can extend from the outer conductor 50 to the cable connector's conductive body, then from the connector's conductive body to the connector's conductive nut or coupler, and then from the connector's conductive coupler to the interface port 272.

The conductive foil layer 48, in one embodiment, is an additional, tubular conductor which provides additional shielding of the magnetic fields. In one embodiment, the foil layer 48 includes a flexible foil tape or laminate adhered to the insulator 46, assuming the tubular shape of the insulator 46. The combination of the foil layer 48 and the outer conductor 50 can suitably block undesirable radiation or signal noise from leaving the cable 118. Such combination can also suitably block undesirable radiation or signal noise from entering the cable 118. This can result in an additional decrease in disruption of data communications through the cable 118 as well as an additional decrease in interference with external devices, such as nearby cables and components of other operating electronic devices.

In one embodiment, the jacket 52 has a protective characteristic, guarding the cable's internal components from damage. The jacket 52 also has an electrical insulation characteristic. In one embodiment, the jacket 52 is compressible along the radial line 54 and is flexible along the longitudinal axis 42. The jacket 52 is constructed of a suitable, flexible material such as polyvinyl chloride (PVC) or rubber. In one embodiment, the jacket 52 has a lead-free formulation including black-colored PVC and a sunlight resistant additive or sunlight resistant chemical structure.

Figure 8:
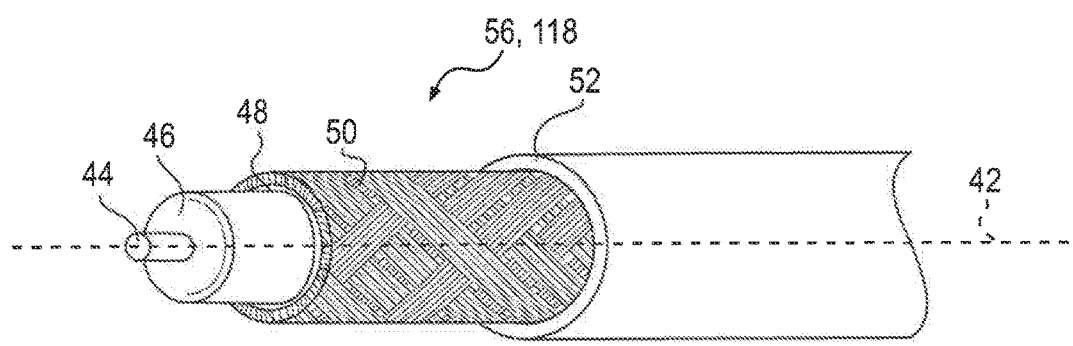
FIG. 8 is an isometric view of one embodiment of a coaxial cable which is configured to be operatively coupled to a data network, illustrating a three-stepped prepared end of the coaxial cable.
Figure 9:
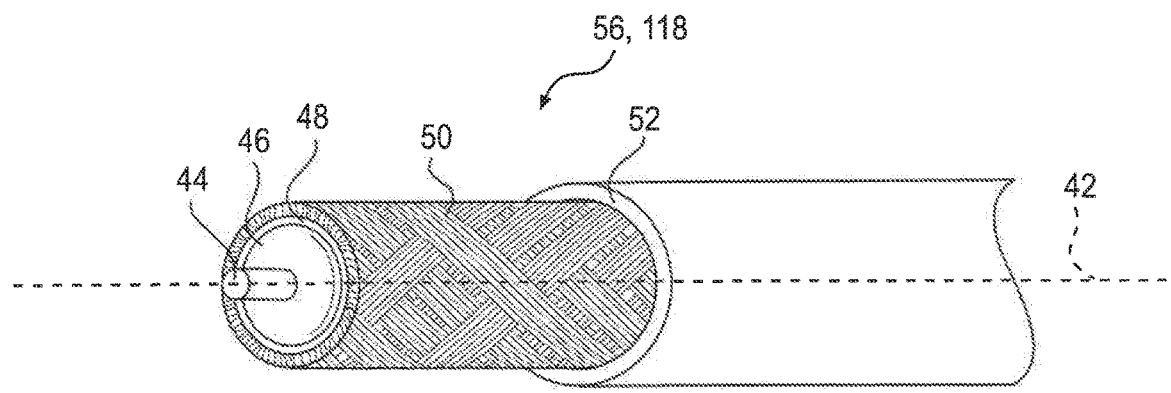
FIG. 9 is an isometric view of one embodiment of a coaxial cable which is configured to be operatively coupled to a data network, illustrating a two stepped prepared end of the coaxial cable.

Referring to FIGS. 8 and 9, in one embodiment an installer or preparer prepares a terminal end 56 of the cable 118 so that it can be mechanically connected to a connector, for example, first or second connector portion 192, 196. To do so, the preparer removes or strips away differently sized portions of the jacket 52, outer conductor 50, foil 48 and insulator 46 so as to expose the side walls of the jacket 52, outer conductor 50, foil layer 48 and insulator 46 in a stepped or staggered fashion. In the example shown in FIG. 8, the prepared end 56 has a three step-shaped configuration. In the example shown in FIG. 9, the prepared end 58 has a two step-shaped configuration. The preparer can use cable preparation pliers or a cable stripping tool to remove such portions of the cable 118. At this point, the cable 118 is ready to be connected to the connector.

Depending upon the embodiment, the components of the cable 118 can be constructed of various materials which have some degree of elasticity or flexibility. The elasticity enables the cable 118 to flex or bend in accordance with broadband communications standards, installation methods or installation equipment. Also, the radial thicknesses of the cable 118, the inner conductor 44, the insulator 46, the conductive foil layer 48, the outer conductor 50 and the jacket 52 can vary based upon parameters corresponding to broadband communication standards or installation equipment.

Figure 10:
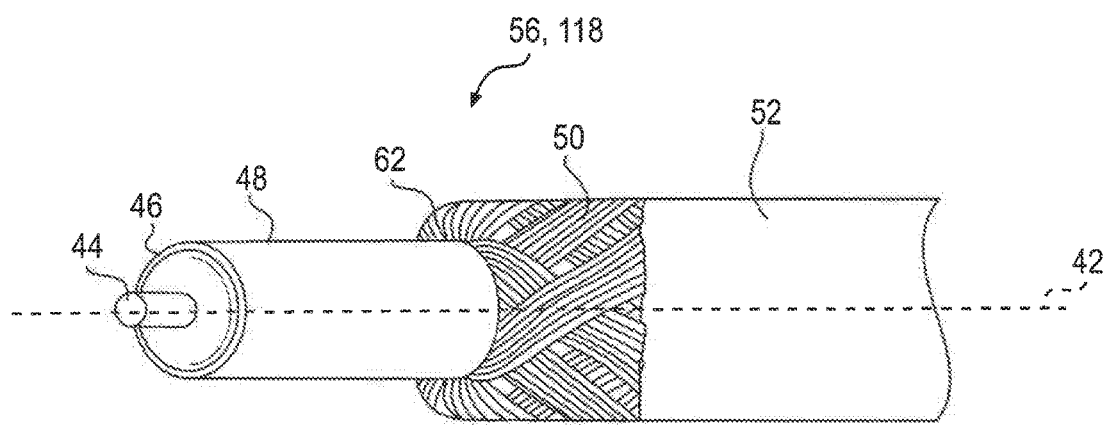
FIG. 10 is an isometric view of one embodiment of a coaxial cable which is configured to be operatively coupled to a data network, illustrating the folded-back, braided outer conductor of a prepared end of the coaxial cable.
Figure 11:
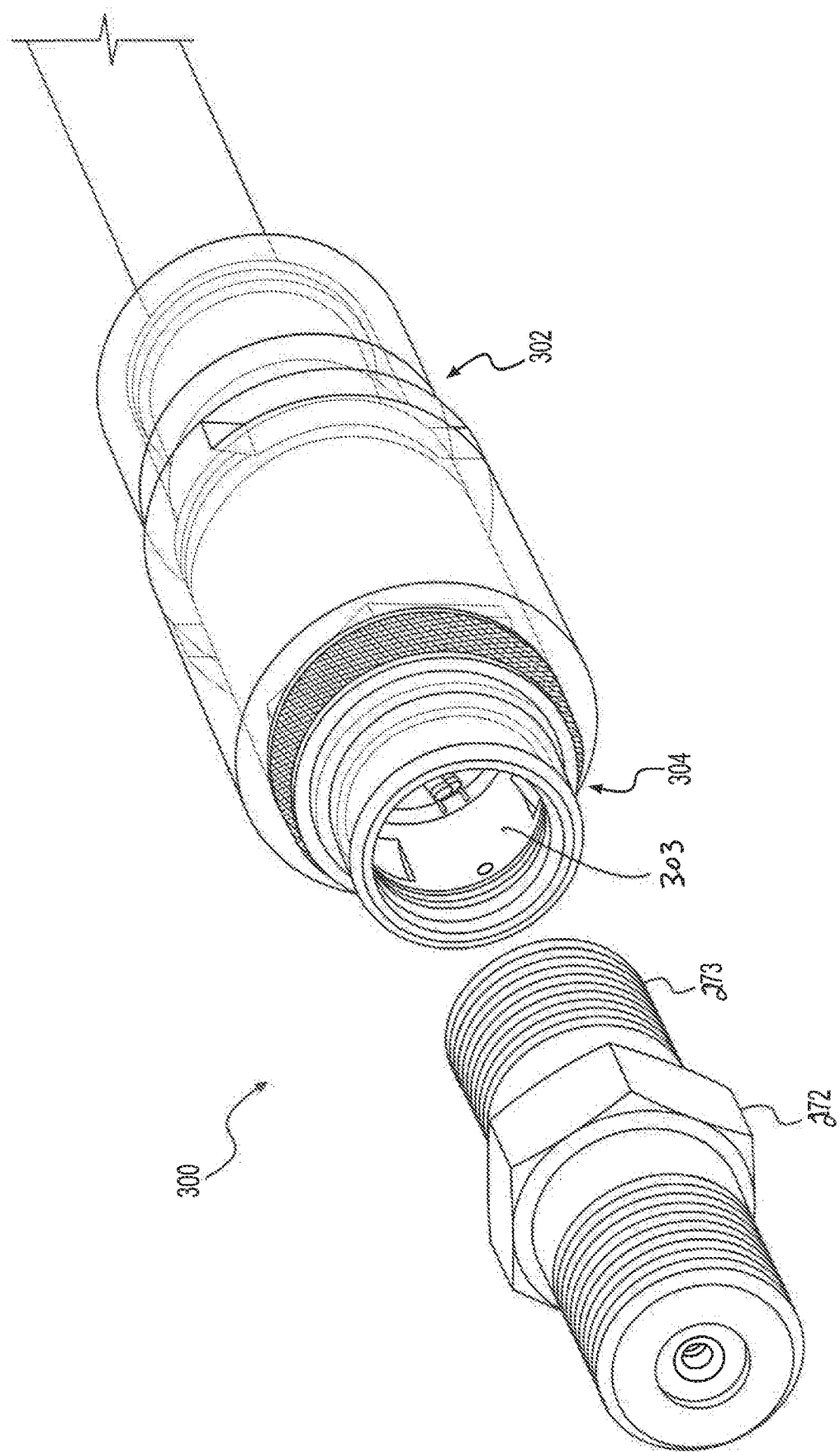
FIG. 11 is a perspective view of an exemplary snap connector in accordance with various aspects of the disclosure.

In one embodiment illustrated in FIG. 10, the installer or preparer performs a folding process to prepare the cable 118 for connection to connector, for example, first or second connector portion 192, 196. In the example illustrated, the preparer folds the braided outer conductor 50 backward onto the jacket 52. As a result, the folded section 60 is oriented inside out. The bend or fold 62 is adjacent to the foil layer 48 as shown. Certain embodiments of the connector include a tubular post. In such embodiments, this folding process can facilitate the insertion of such post in between the braided outer conductor 50 and the foil layer 48.

Depending upon the embodiment, the components of the cable 118 can be constructed of various materials which have some degree of elasticity or flexibility. The elasticity enables the cable 118 to flex or bend in accordance with broadband communications standards, installation methods or installation equipment. Also, the radial thicknesses of the cable 118, the inner conductor 44, the insulator 46, the conductive foil layer 48, the outer conductor 50, and the jacket 52 can vary based upon parameters corresponding to broadband communication standards or installation equipment.

Referring now to FIGS. 11-19, an exemplary embodiment of a snap connector 300 is illustrated and described.

The connector 300 may include a connector portion 302 and an adapter portion 304. The connector portion 302 may include a post 340, a coupling member 330, a connector body 350, an integral pin 310, and a fastener member 360. The post 340 is configured to receive a center conductor 44 surrounded by a dielectric 46 of a coaxial cable 118, the connector body 350 is attached to the post 340, and the coupling member 330 is attached to the post 340. The coupling member 330 has one or more flexible fingers 337 separated by axial slits, wherein the flexible fingers 337 are configured receive a rear portion of the adapter portion 304 by passing over the rear portion of the adapter portion 304 in a first axial direction.

In some aspects, the post 340 includes a first end 341, a second end 342, an inner surface 343, and an outer surface 344. Furthermore, the post 340 may include a flange 345, such as an externally extending annular protrusion, located proximate or otherwise near the first end 341 of the post 340. The flange 345 may include an outer surface 347 facing the second end 342 of the post 340 and corresponding to a shape of a surface of a lip 336 of the coupling member 330. Further still, an embodiment of the post 340 may include a surface feature such as a lip or protrusion that may engage a portion of a connector body 350 to secure axial movement of the post 340 relative to the connector body 350. However, the post 340 may not include such a surface feature, and the coaxial cable connector 300 may rely on press-fitting and friction-fitting forces and/or other component structures to help retain the post 340 in secure location both axially and rotationally relative to the connector body 350. The post 340 should be formed such that portions of a prepared coaxial cable 10 including the dielectric 16 and center conductor 18 can pass axially into the second end 342 and/or through a portion of the tube-like body of the post 340. Also, the post 340 should be dimensioned such that the post 340 may be inserted into an end of the prepared coaxial cable 118, around the dielectric 46 and under the protective outer jacket 52 and conductive grounding shield or strand 50. Accordingly, where an embodiment of the post 340 may be inserted into an end of the prepared coaxial cable 118 under the drawn or folded-back conductive strand 50, substantial physical and/or electrical contact with the strand layer 50 may be accomplished thereby facilitating grounding through the post 340. The post 340 may be formed of metals or other conductive materials that would facilitate a rigidly formed post body. In addition, the post 340 may be formed of a combination of both conductive and non-conductive materials. For example, a metal coating or layer may be applied to a polymer of other non-conductive material. Manufacture of the post 340 may include casting, extruding, cutting, turning, drilling, knurling, injection molding, spraying, blow molding, component over molding, or other fabrication methods that may provide efficient production of the component.

The coupling member 330 is a non-threaded port coupling member having one or more flexible fingers 337 for various embodiments of a push-on connector, F-connector, cable connector (including triaxial and coaxial), and may be a coupling member for a device/connector that does not include a coaxial or triaxial cable. The coupling member 330 may include a first end 331, second end 332, an inner surface 333, and an outer surface 334. The inner surface 333 of the coupling member 330 may be a smooth, non-threaded surface to allow the coupling member 330 to be axially inserted over the adapter portion 304. The coupling member 330 may or may not be rotatably secured to the post 340. The coupling member 330 may be configured to house the integral pin 310 surrounded by a dielectric insulator 313, which may be a resilient plastic. The integral pin 310 includes a rear socket 312 configured to receive the center conductor 44 of a prepared end of the cable 118, and the pin 310 includes a male pin 314 at its forward end. The socket 312 and male pin 314 provide an electrical ground path extending from the center conductor 44.

The connector portion 302 may include a shroud 316, for example, a solid metal shroud, press fit to the coupling member 330. The shroud 316 may protect the flexible fingers 337 and improve shielding. The shroud 316 may also keep water out of the connector portion 302. In some aspects, the shroud 316 may be plastic.

The adapter portion 304 includes a body 305, an integral pin 307 surrounded by a dielectric insulator 308, which may be a resilient plastic. The integral pin 307 includes a rear socket 309 configured to receive the male pin 314 of the connector portion 302, and the pin 307 includes a male pin 311 at its forward end. The socket 309 and male pin 307 provide an electrical ground path extending from the center conductor 44 through the integral pin 310. In some aspects, the adapter portion 304 may have an outer surface similar to that of the interface port 272 described above.

The flexible fingers 337 of the coupling member 330 may be configured to grip the adapter portion 304 via a retention structure 329 (e.g., a radially inward lip) that cooperates with a retention structure 306 (e.g., a circumferential groove) of a body 305 of the adapter portion 304. The connection between the connector portion 302 and the adapter portion 304 may be sealed by a seal member 319 between an inner surface of the shroud 316 and an outer surface of the body 305 of the adapter portion 304. The connector portion 302 may include a seal member 317 between the connector body 350 and the coupling member 330.

The adapter portion 304 includes a coupling portion 391 having at least one resilient contact 339 extending radially inward a distance from an inner surface 303 of the coupling portion 391. The resilient contact 339 is configured to provide a retention force, and at least one resilient protrusion 377 extends radially inward a distance from the inner surface 303 of the coupling portion 391. The resilient protrusion 377 is configured to contact a conductive surface of the body 305.

The at least one relisient protrusion 377 is configured to maintain physical and electrical contact between the body 305 and the coupling portion 391 to extend an RF shield and grounding path through the connector 300. Embodiments of the at least one resilient protrusion 377 may be structurally integral with the coupling portion 391. Alternatively, the at least one resilient protrusion 377 may be integrally connected to at least one resilient contact 392 through a conductive (e.g. metal) strip that can be embedded into the coupling portion 391.

The at least one resilient protrusion 377 may be located on/along an annular internal lip proximate the rear end of the coupling portion 391. The at least one resilient protrusion 377 may project and/or extend radially inward towards a flange 345 of the body 305. For example, the at least one resilient protrusion 377 may physically and electrically contact the body 305 to maintain electrical grounding with the body 305 regardless of the advancement of the coupling portion 391 onto a port 272. Embodiments of coupling portion 391 may include a single protrusion 377 proximate the rear end of the coupling portion 391, or may include a plurality of contacts 377 spaced apart from each other extending around or partially around the coupling portion 391 proximate the rear end. Thus, the locations, configurations, orientations, and the number of contacts 377 may vary, so long as at least one protrusion 377 physically engages (e.g. biases against) the body 305 to extend electrical grounding therebetween. The resilient nature of the contacts 377 (e.g. resilient protrusions, bumps, etc.) provides a biasing force against the rigid post body 305 to establish constant contact between the body 305 and the contacts 377. For example, while operably configured (e.g. when the connector is fully advanced onto the port 372 and/or the connector 300 is in a compressed position), the resilient contacts 377 may come into contact with the body 305, and deflect slightly radially outward (back towards the coupling portion 391), and due to the resiliency of the contacts 377, the contacts 377 can exert a constant biasing force in a radially inward direction against the body 305 to establish and maintain electrical connection between the coupling portion 391 and the body 305.

Furthermore, the resilient contact 339 is configured to provide a retention force between the coupling portion 391 and the corresponding mating port 372. Embodiments of the resilient contact 339 may be structurally integral with the coupling portion 391. Alternatively, the resilient contact 339 may be integrally connected to the at least one resilient protrusion 377 through a conductive (e.g. metal) strip embedded into the body 305 of the coupling portion 391. The at least one resilient contact 339 may be located on/along/around the body 305 of the coupling portion 391. The at least one resilient contact 339 may be resilient projections, prongs, fingers, or one-way latch fingers that project and/or extend radially inwards from an otherwise smooth inner surface into the generally axial opening of the coupling portion 391 and partially axially towards a rear end of the coupling portion 391. Embodiments of the contacts 339 may be designed to pass over threads 373 of the port 372 in a first axial direction (e.g. axially advancing the coupling portion 391 onto the port 372), but may mechanically interfere with the one or more threads 373 in a second axial direction (e.g. axially removing the coupling portion 391 from the port 372). For instance, the resilient contact 339 may be biased in a direction to allow the crests of the threads 373 of the port 372 to push the contacts 339 outward during forward axial movement of the coupling portion 391 as the coupling portion 391 is advanced onto the port 372, but which come to rest with the tips 339' of the contacts 339 lodged securely against the working surface of the port threads 373, preventing the release of the adapter portion 304 if pulled in an opposite axial direction. The contact 339 and/or the tip 339' of the contact 339 may include a tapered or ramped surface design that may act as a ratcheting surface which allows the contacts 339 (or just the tips 339' to pass over the threads 373 in a first axial direction, but mechanically prevent motion in the second, opposite axial direction). Other embodiments of tip 339' may include a curved or rounded configuration to maximize or increase a retention force with a surface, such as working surface of port 372. The engagement between the resilient contact 339 and the threads 373 of the port 372 can provide a retention force between the adapter portion 304 and the port 372 in an axial direction. To disengage the connector 300 from the port 372, a user may rotate/turn the adapter portion 304 in a direction which loosens the coupling portion 391 from the port 372. For example, rotating the adapter portion 304 in a counter-clockwise direction may unthread the contacts 339 from the threads 373 of the port 372. Embodiments of coupling portion 391 may include a single contact 339, or may include a plurality of contacts 339 spaced apart from each other extending around or partially around the coupling portion 391 at various axial positions on the coupling portion 391. Thus, the locations, configurations, orientations, and the number of contacts 339 may vary, so long as at least one contact 339 physically engages the port 372 when the coupling portion 391 is advanced onto the port 372.

The coupling portion 391, including the resilient contacts 339 and the resilient protrusion 377, may be formed of conductive materials facilitating shielding/grounding through the coupling portion 391. Accordingly the coupling portion 391 may be configured to extend an electromagnetic buffer by electrically contacting conductive surfaces of an interface port 372 when a coaxial cable connector, such as connector 300, is advanced onto the port 372. In addition, the coupling portion 391 may be formed of non-conductive material and function only to physically secure and advance a connector 300 onto an interface port 372. Also, the coupling portion 391 may be formed of both conductive and non-conductive materials. In addition, the coupling portion 391 may be formed of metals or polymers or other materials that would facilitate a rigidly formed body. Manufacture of the coupling portion 391 may include casting, extruding, cutting, turning, tapping, drilling, injection molding, blow molding, or other fabrication methods that may provide efficient production of the component. Further embodiments of the coupling portion 391 may be formed of plastic, or other non-conductive, non-metal material having a single (or more than one) conductive strip embedded into the body 305 of the coupling portion 391. Thus, conductive materials need not completely surround the port 372; a conductive strip integrally connecting at least one resilient contact 339 and at least one resilient protrusion 377 may contact the surface of a port or a conductive surface (e.g. a post or other conductive surface of a cable connector). In other words, a strip of metal having at least one resilient contact 339 at one end and at least one resilient protrusion 377 at the other end may be embedded into an embodiment of a non-conductive, non-metal coupling portion 391, wherein the conductive strip, particularly, the resilient contact(s) 339 and the resilient protrusion(s) 377, contact matably corresponding conductive surfaces to extend electrical grounding.

The connector 300 may include a forward seal 396 coupled to the body 305 by a seal ring 397. The seal ring 397 may be knurled or the like to assist with removal of the adapter portion 304. The forward seal 396 may be conductive or non-conductive and is configured to provide a weathertight seal between the adapter portion 304 and the interface port 372. The forward seal 396 may be transparent or any degree of opaqueness. The connector 300 may also include an outer sheath 394 covering the connector portion 302 and a portion of the body 305 of the adapter portion 304. The outer sheath 394 may be non-conductive to protect a user from unexpected electrical current. The outer sheath 394 may be transparent or any degree of opaqueness.

Figure 12:
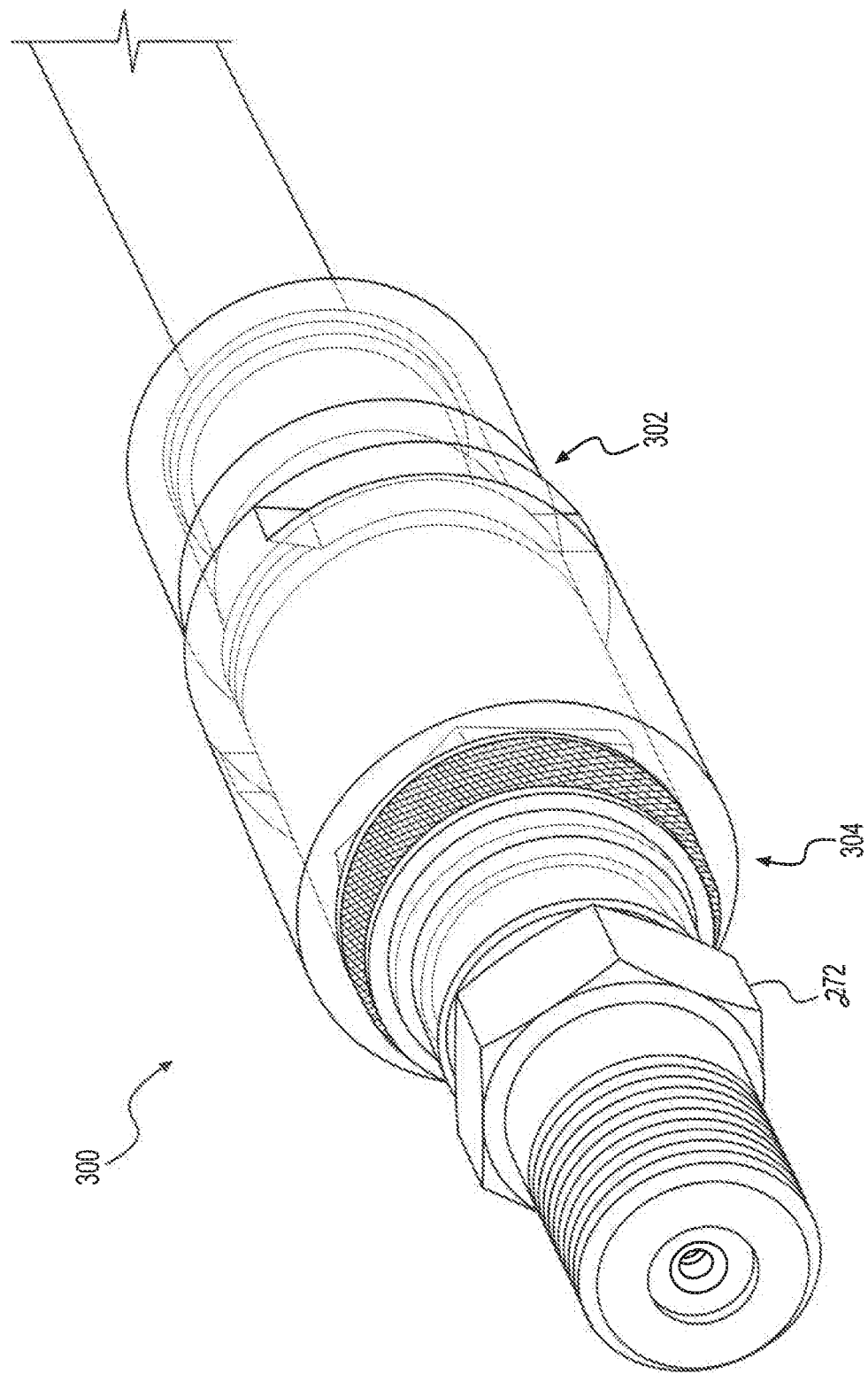
FIG. 12 is a perspective view of the exemplary snap connector of FIG. 11 coupled with an interface port.
Figure 13:
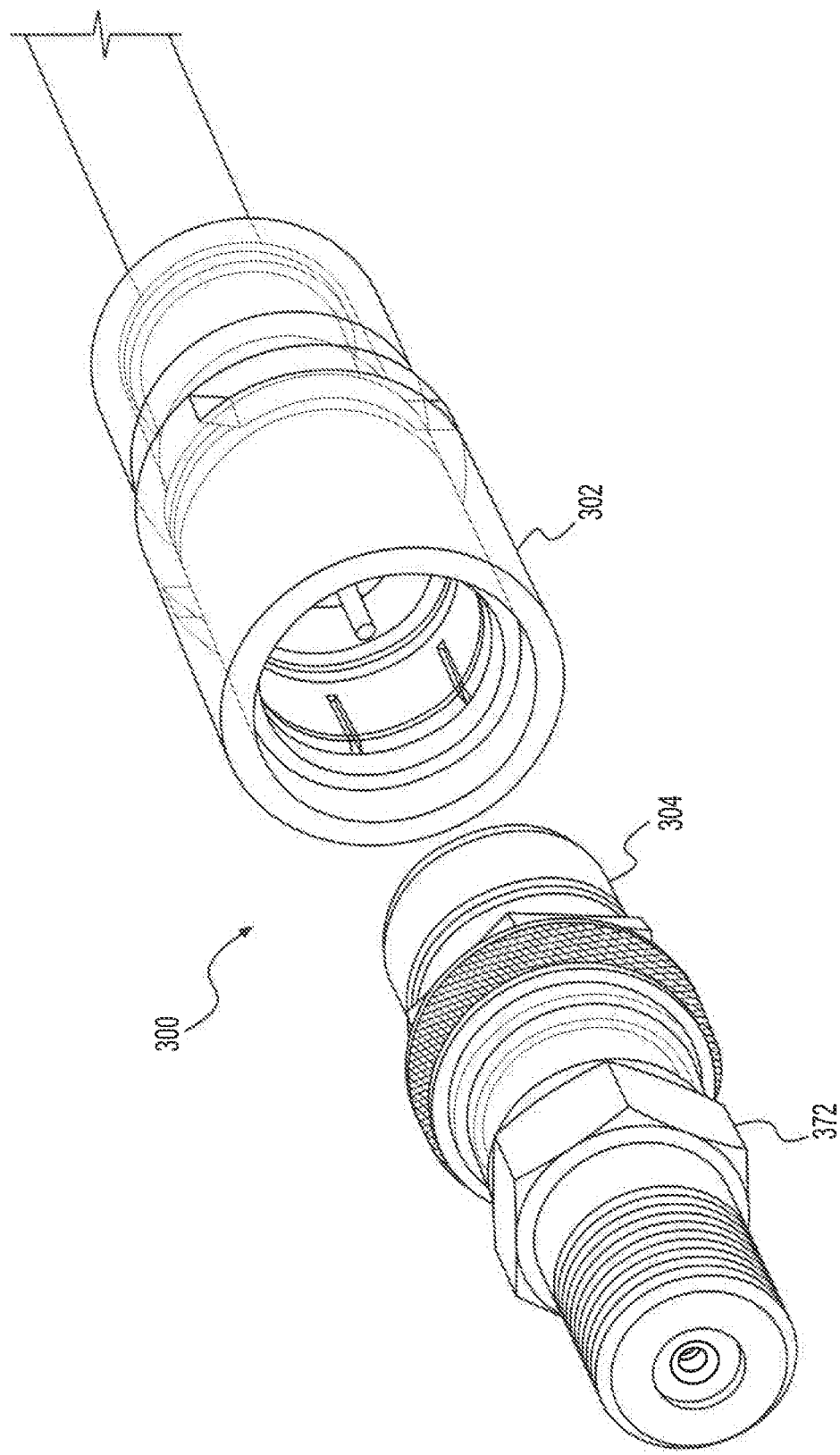
FIG. 13 is a perspective view of the exemplary snap connector of FIG. 11 with an adapter portion coupled with the interface port and a connector portion removed from the interface port.
Figure 14:
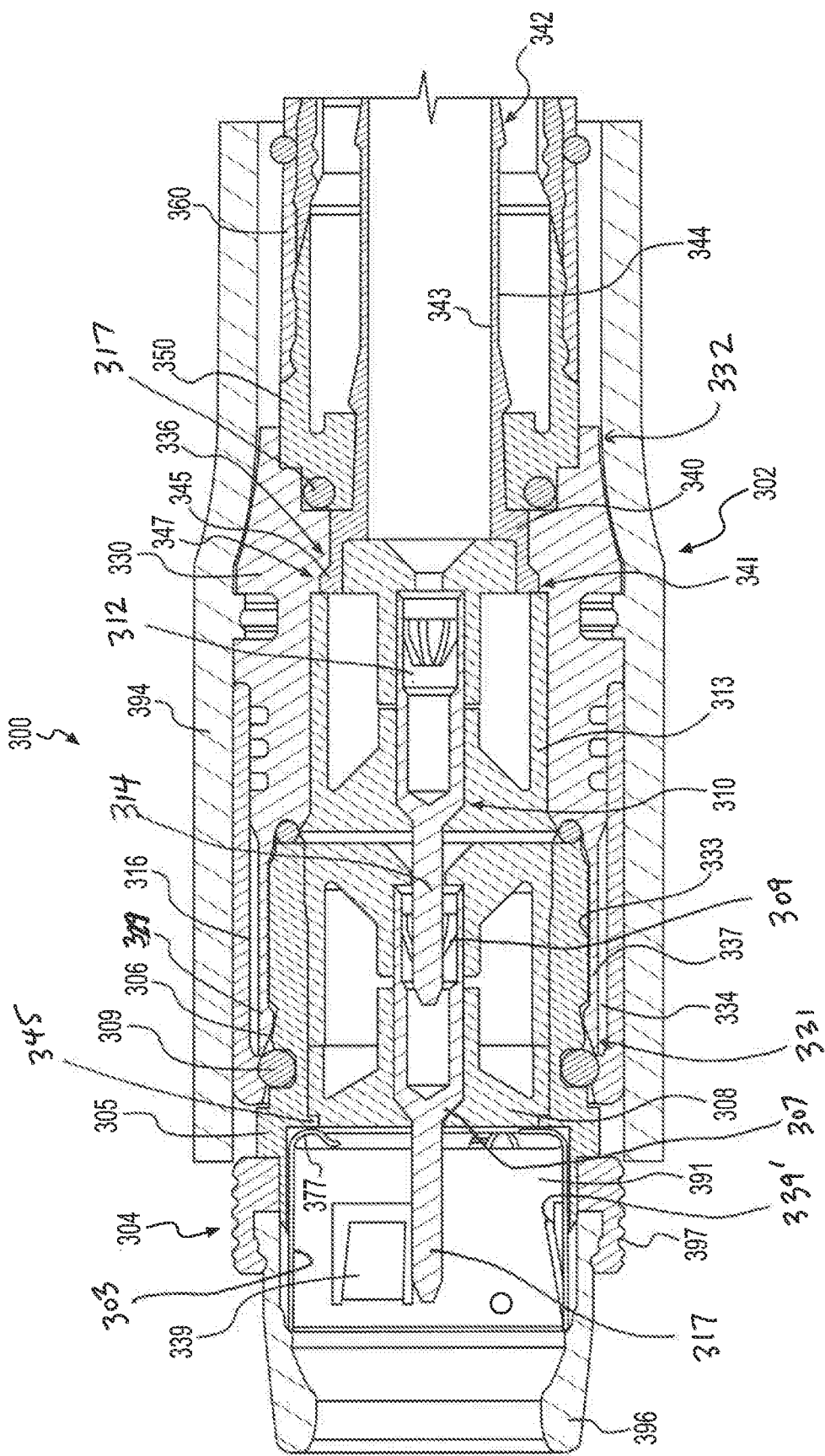
FIG. 14 is a cross-sectional view of the exemplary snap connector of FIG. 11.
Figure 15:
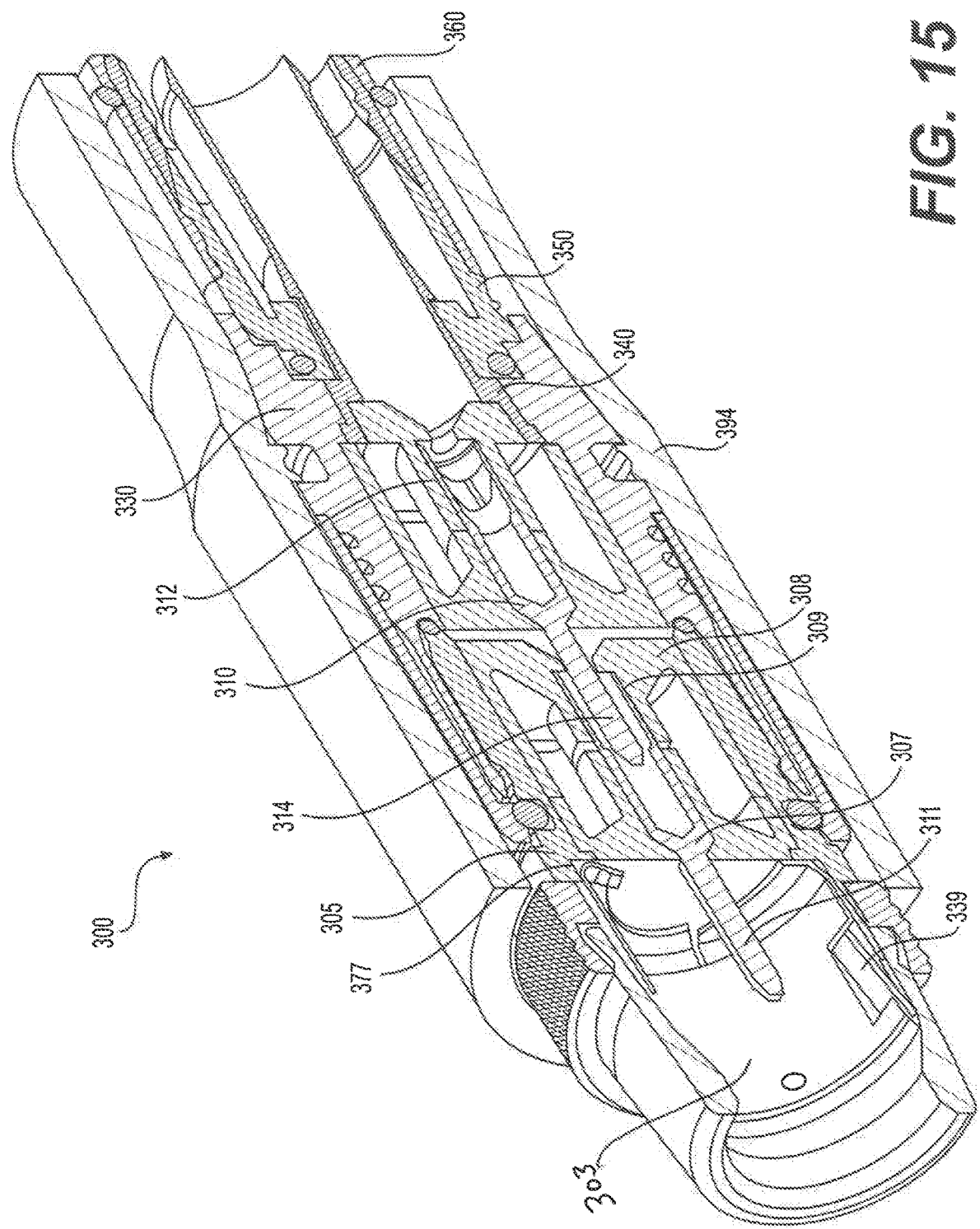
FIG. 15 is a cross-sectional, perspective view of the exemplary snap connector of FIG. 11 with the adapter portion removed.
Figure 16:
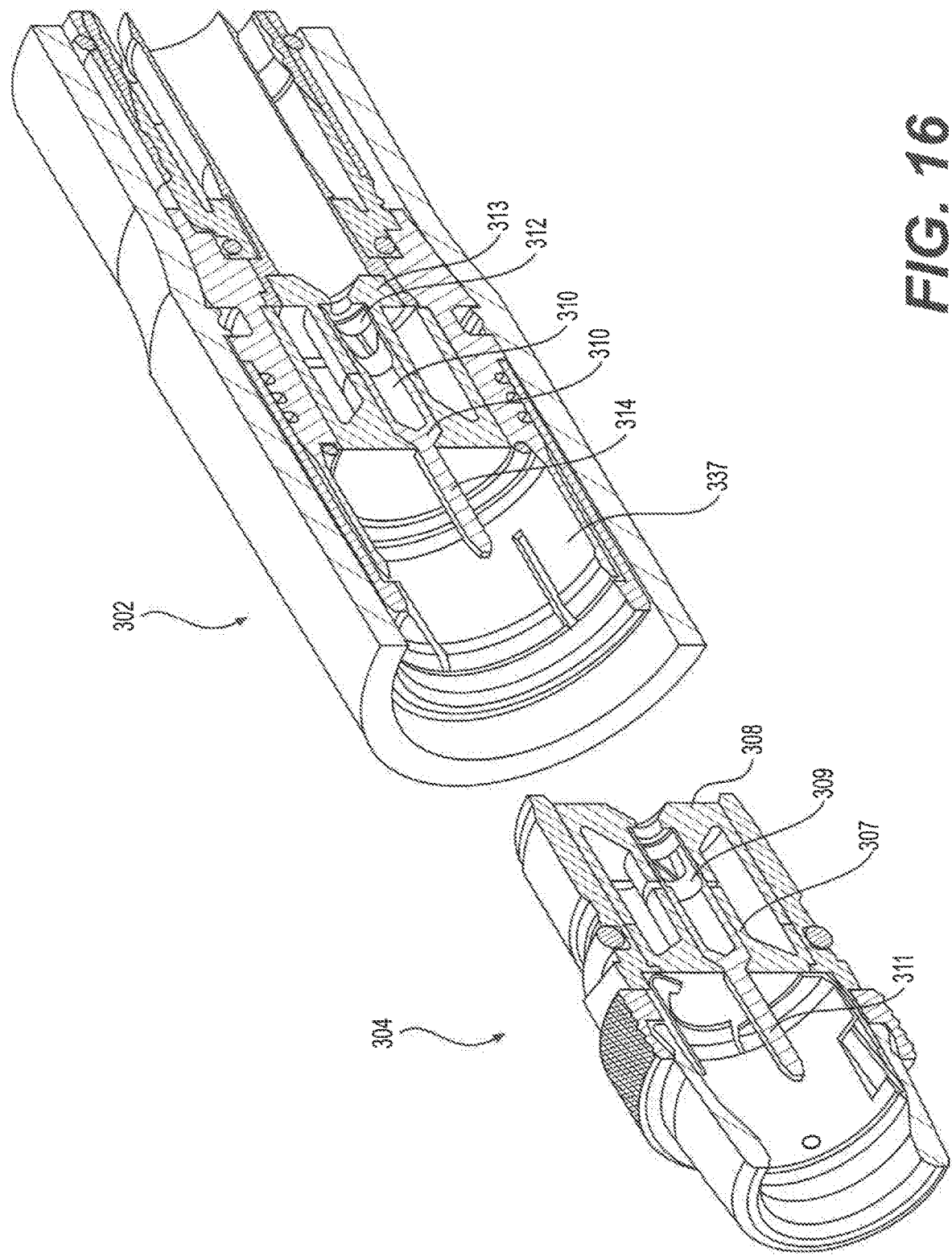
FIG. 16 is a cross-sectional, perspective view of the exemplary snap connector of FIG. 11 with the adapter portion removed.
Figure 17:
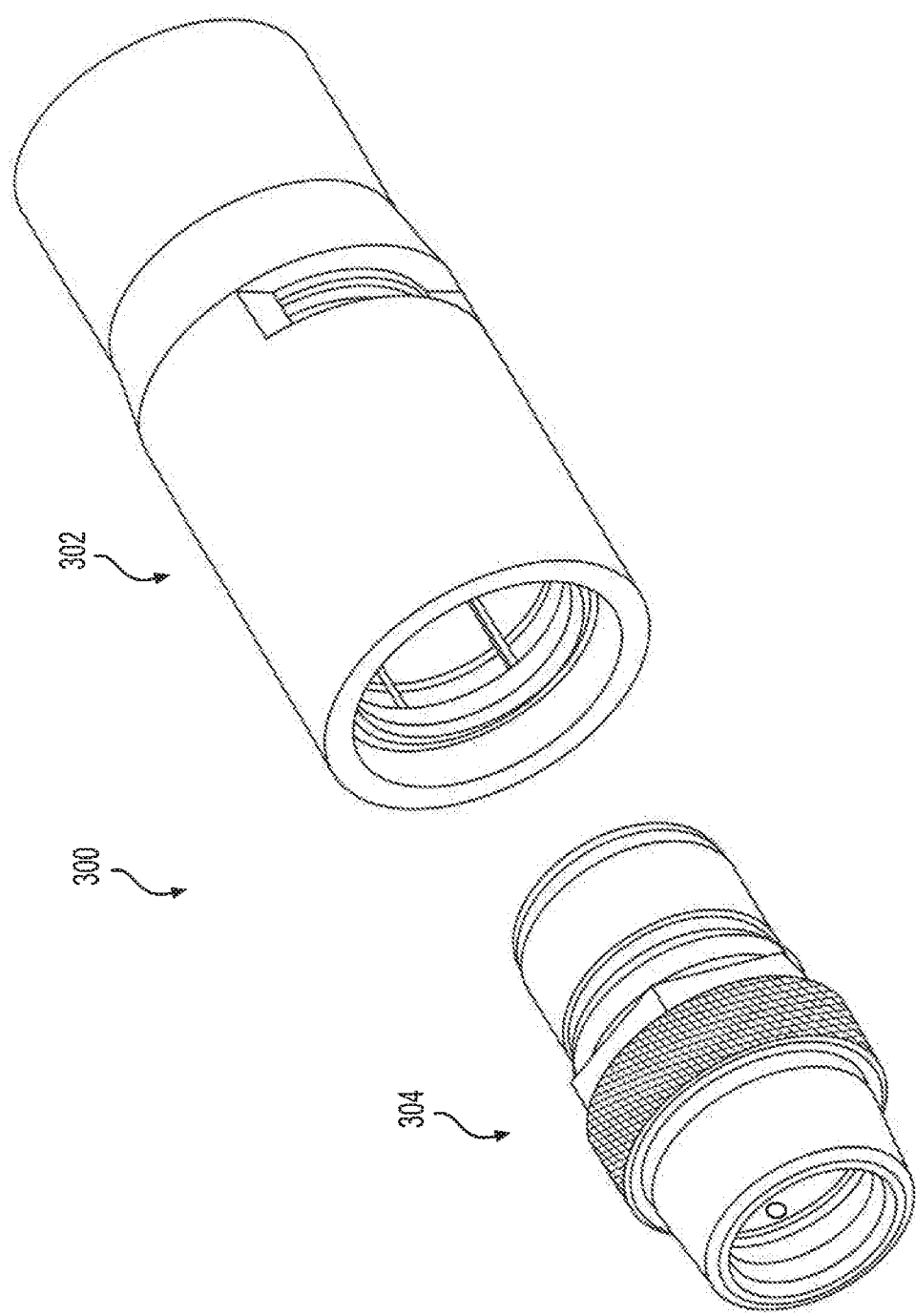
FIG. 17 is a perspective view of the exemplary snap connector of FIG. 11 with the adapter portion removed.
Figure 18:
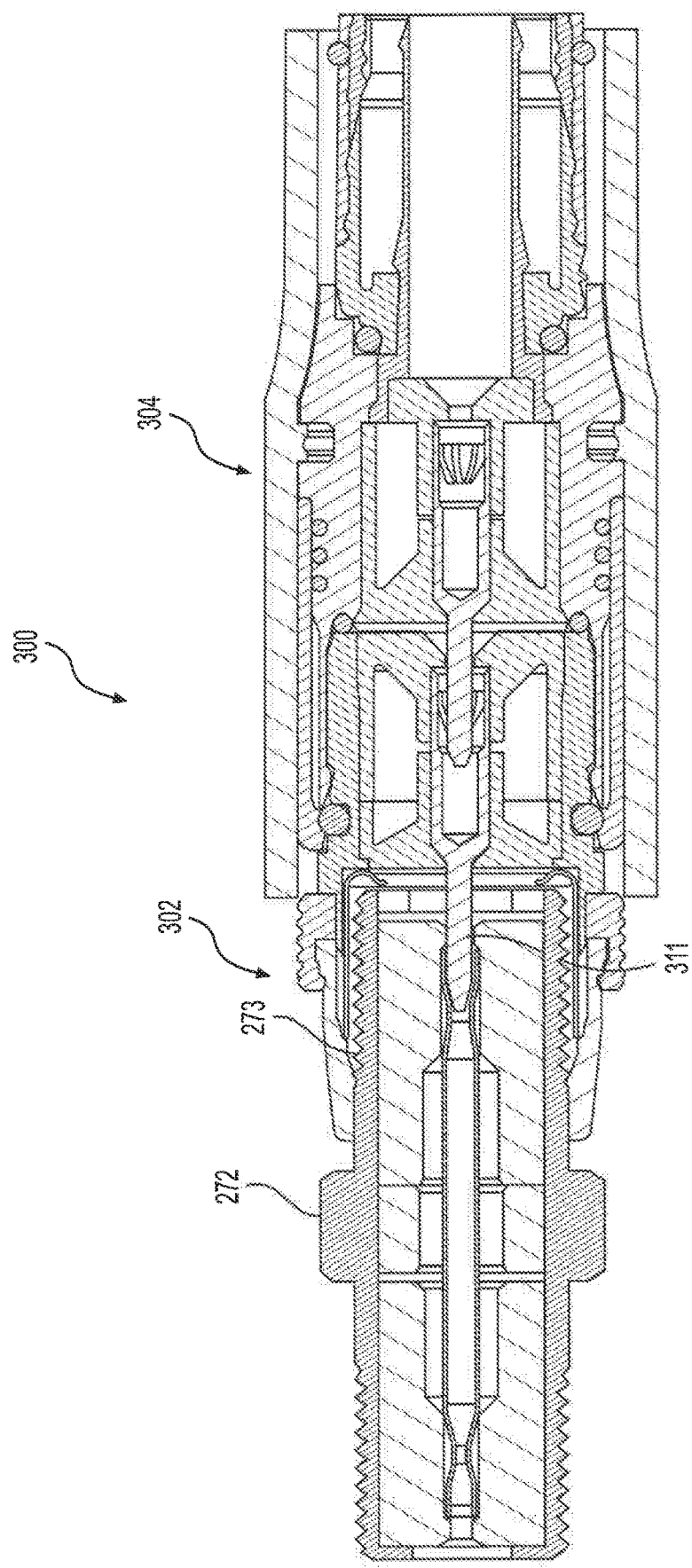
FIG. 18 is a cross-sectional view of the exemplary snap connector of FIG. 11 coupled with an interface port.
Figure 19:
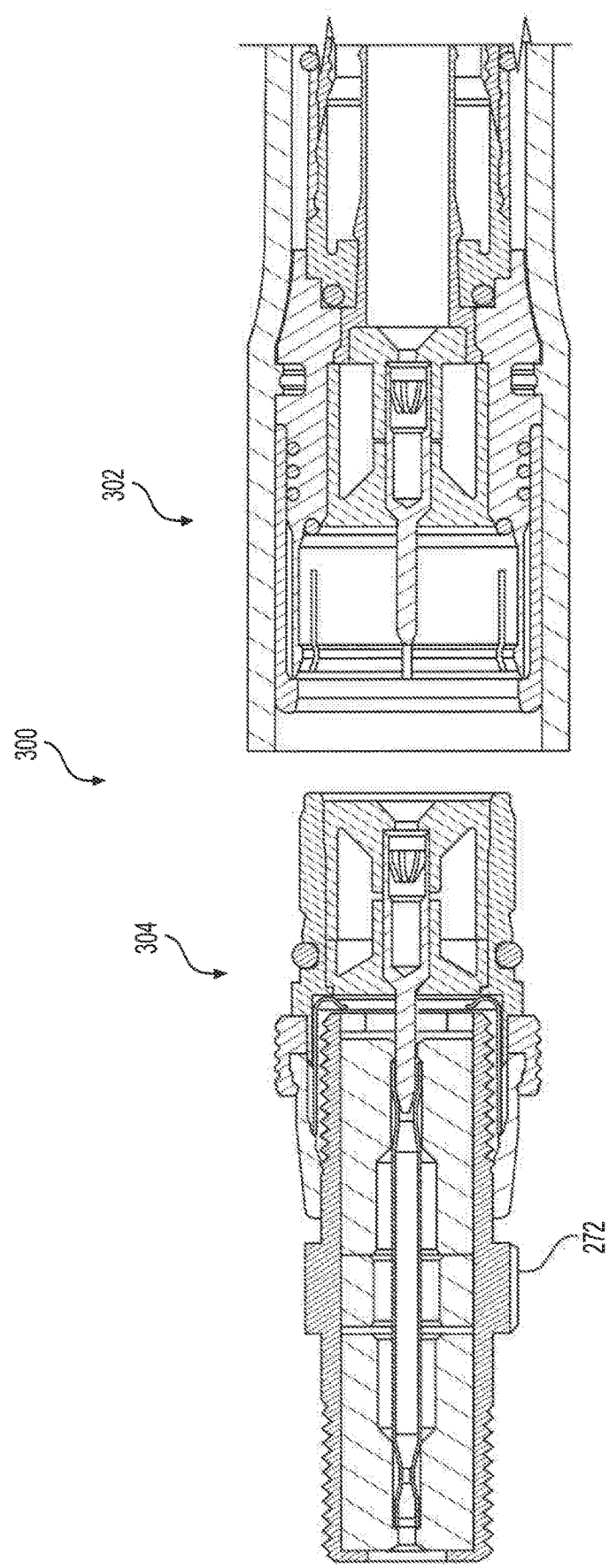
FIG. 19 is a cross-sectional view of the exemplary snap connector of FIG. 11 with an adapter portion coupled with the interface port and a connector portion removed from the interface port.
Figure 20:
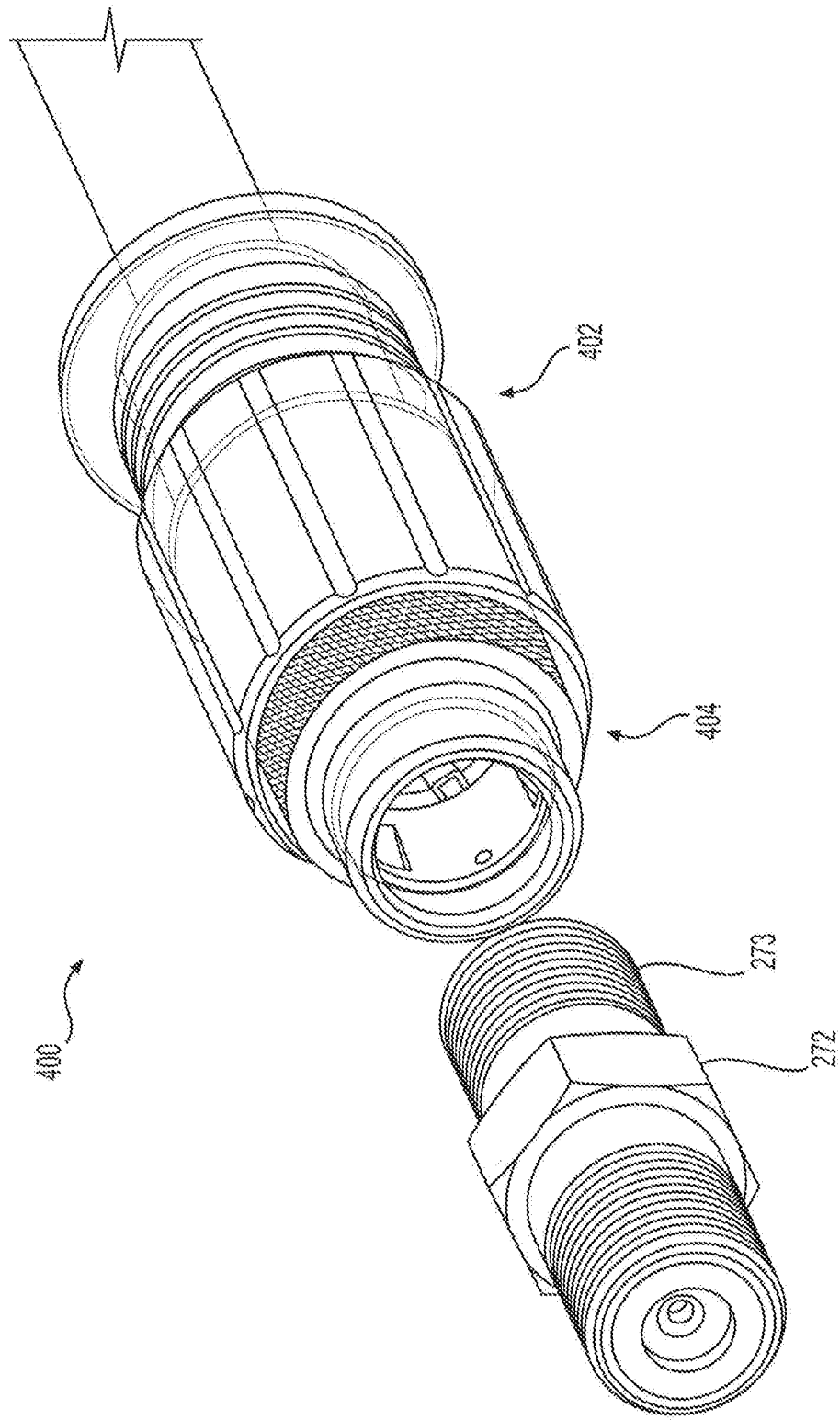
FIG. 20 is a perspective view of another exemplary snap connector in accordance with various aspects of the disclosure.
Figure 21:
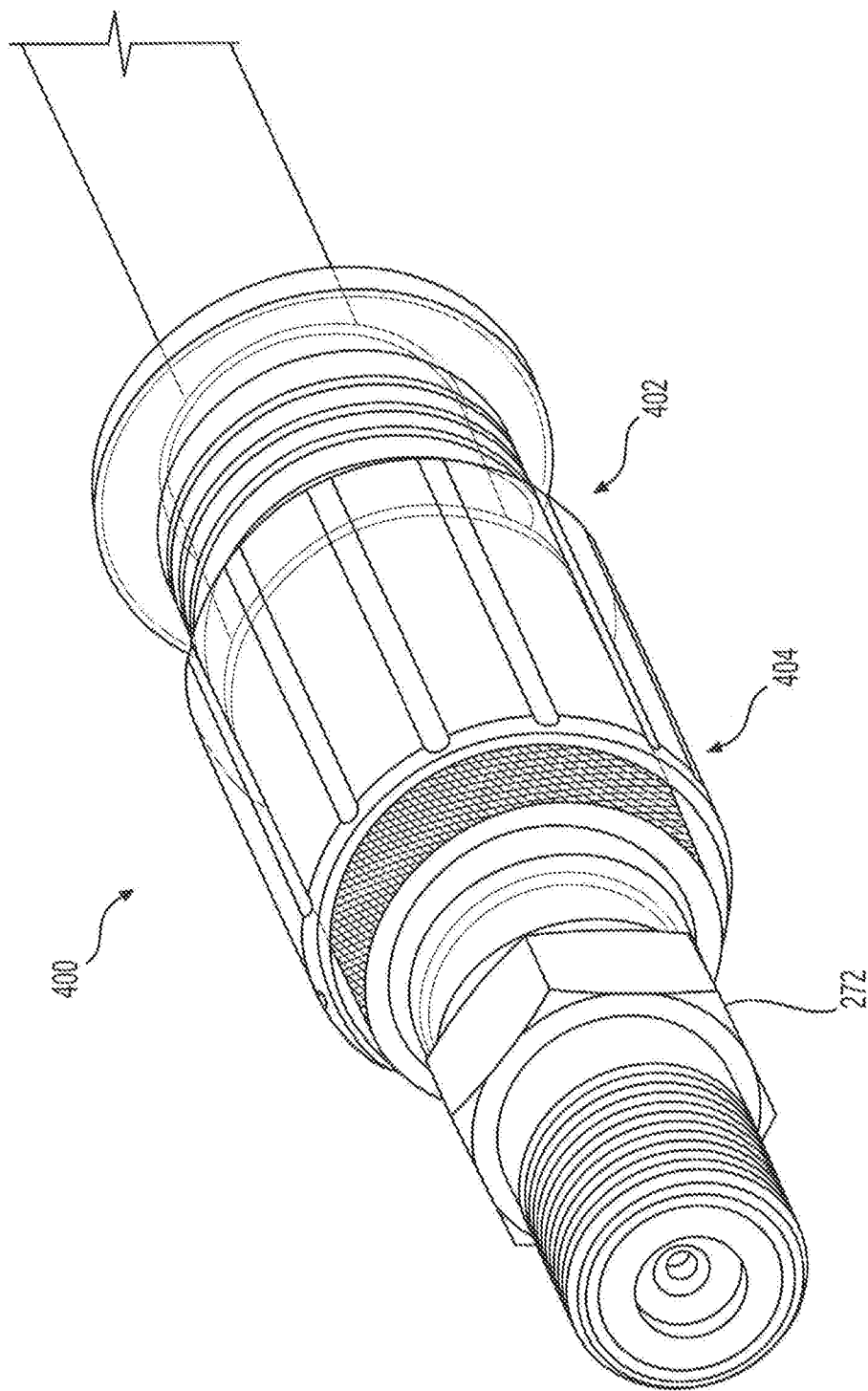
FIG. 21 is a perspective view of the exemplary snap connector of FIG. 20 coupled with an interface port.
Figure 22:
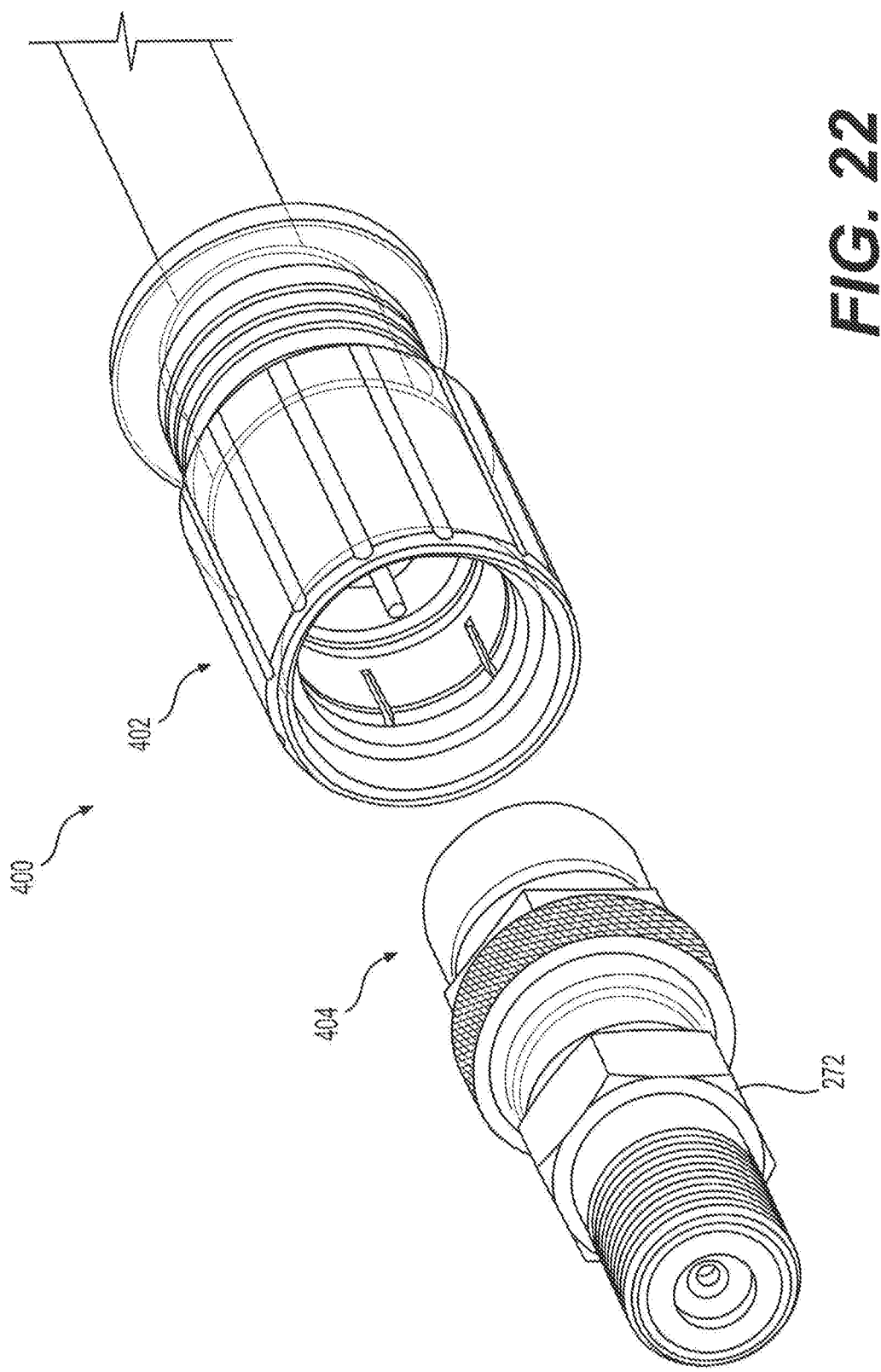
FIG. 22 is a perspective view of the exemplary snap connector of FIG. 20 with an adapter portion coupled with the interface port and a connector portion removed from the interface port.
Figure 24:
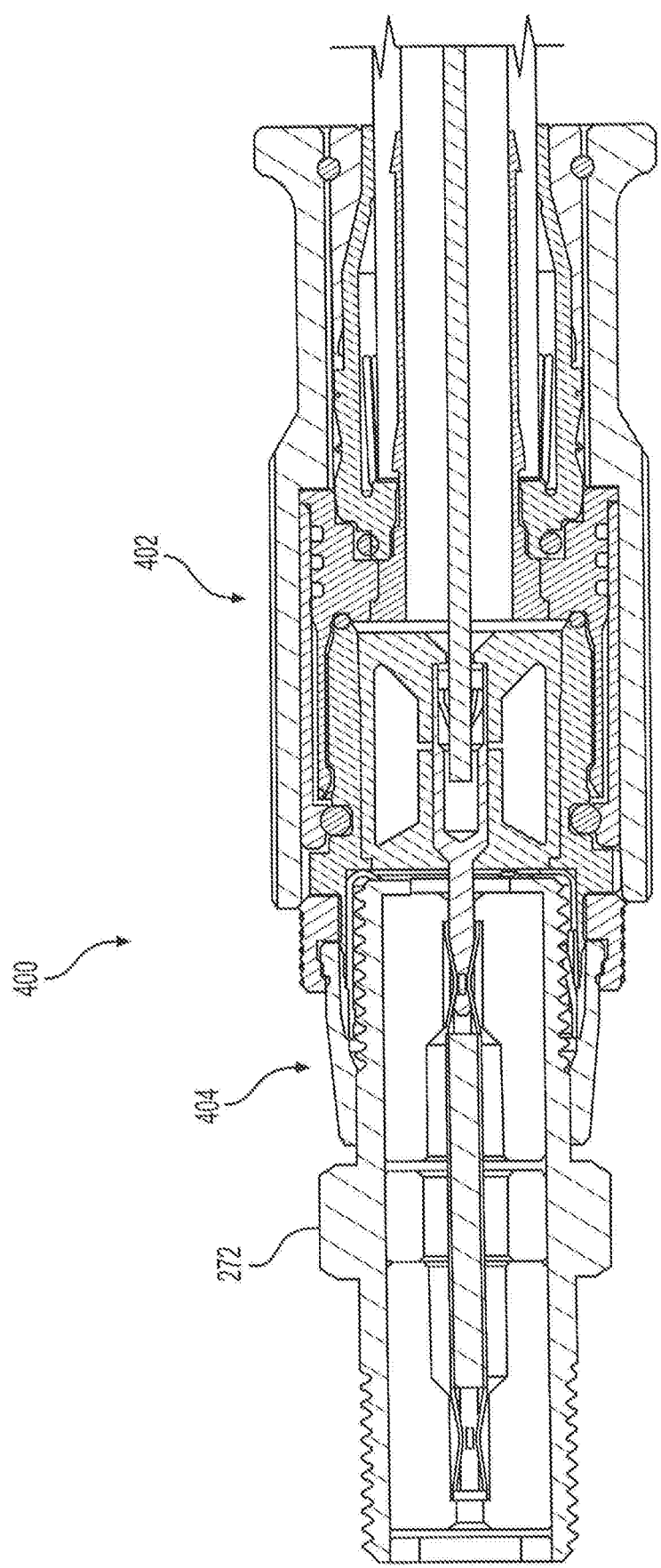
FIG. 24 is a cross-sectional, perspective view of the exemplary snap connector of FIG. 20 coupled with an interface port.
Figure 25:
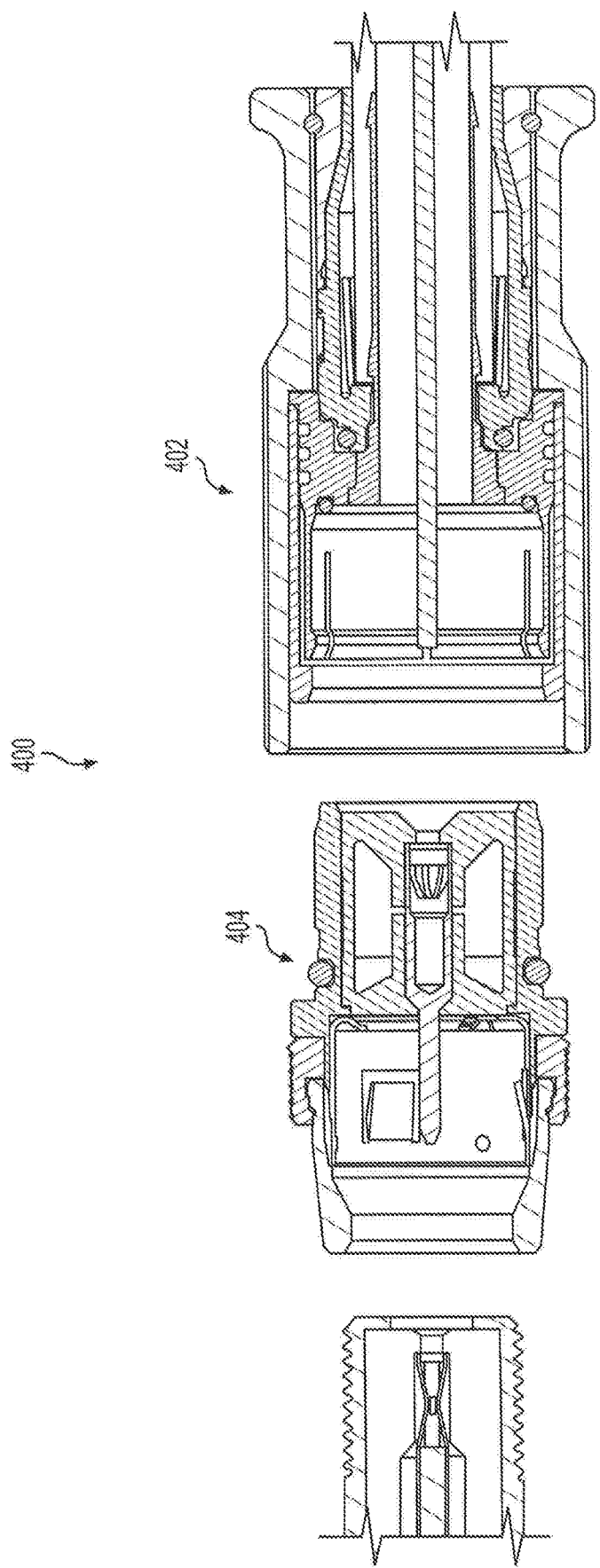
FIG. 25 is a cross-sectional view of the exemplary snap connector of FIG. 20 with an adapter portion coupled with the interface port and a connector portion removed from the interface port
Figure 26:
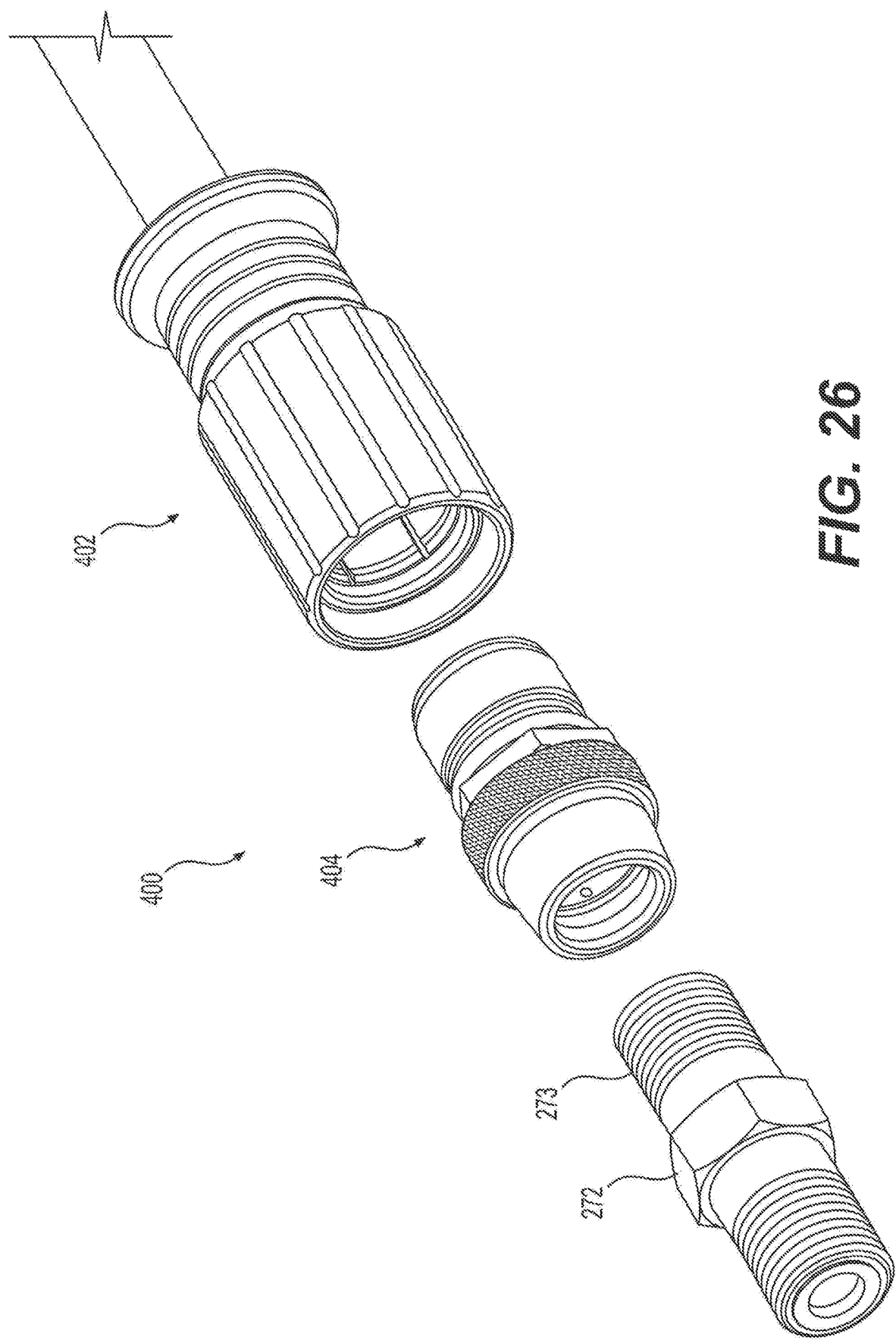
FIG. 26 is a perspective view of the exemplary connector of FIG. 20 with the adapter portion separated from the connector portion.
Figure 27:
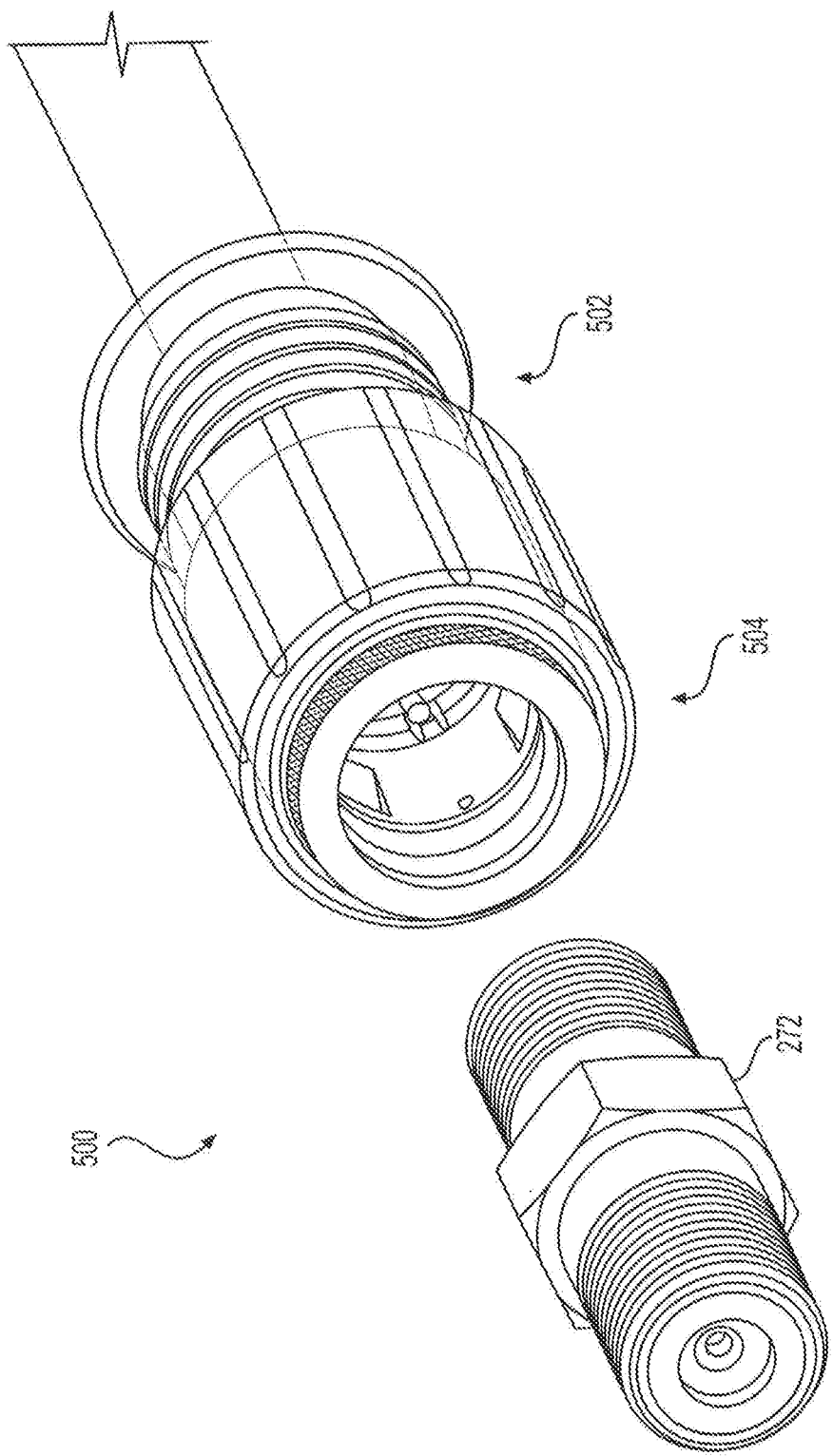
FIG. 27 is a perspective view of another exemplary snap connector in accordance with various aspects of the disclosure.
Figure 28:
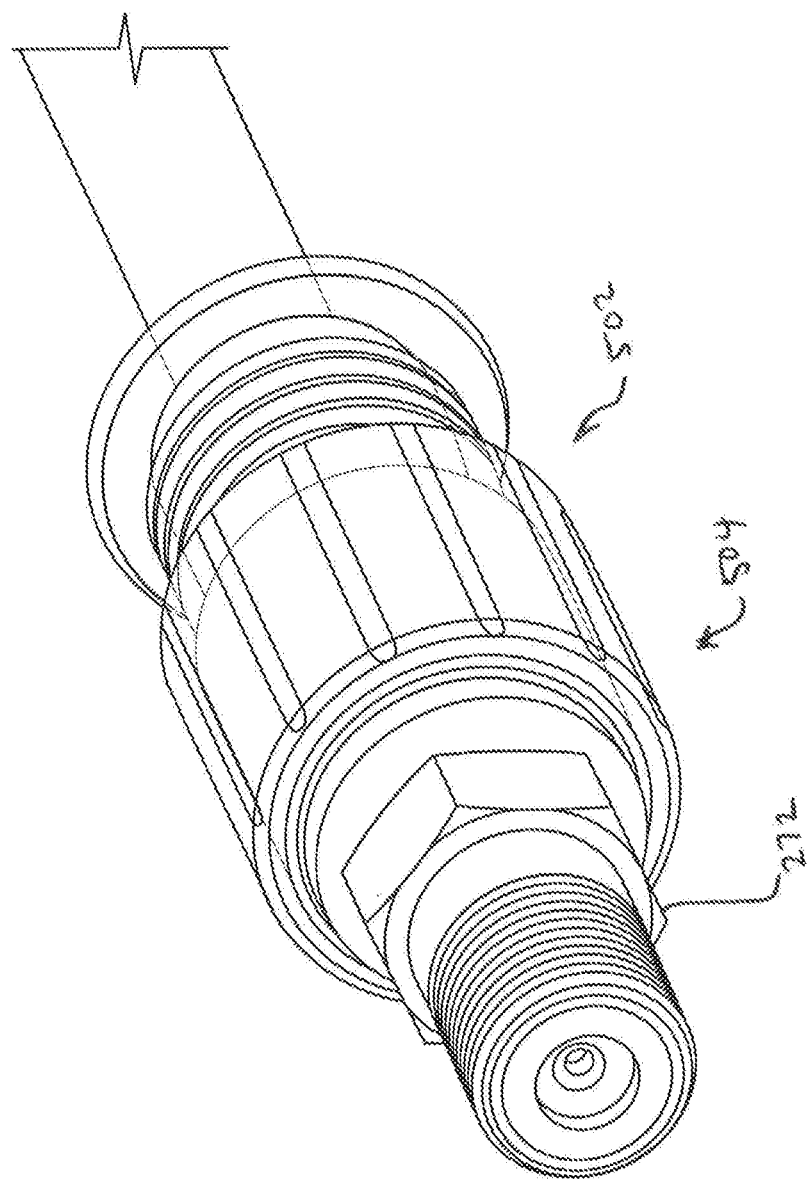
FIG. 28 is a perspective view of the exemplary snap connector of FIG. 27 coupled with an interface port.
Figure 29:
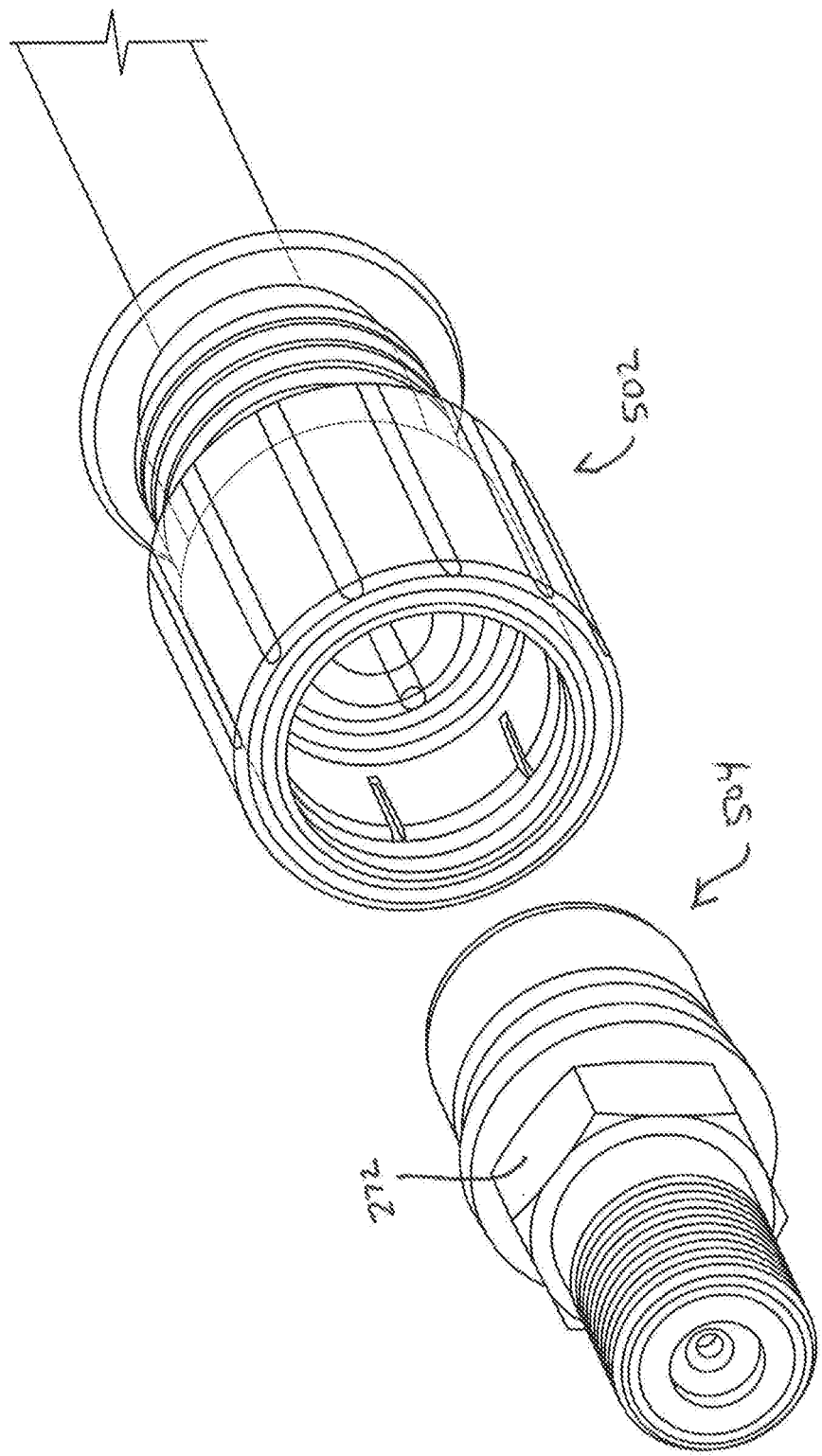
FIG. 29 is a perspective view of the exemplary snap connector of FIG. 27 with an adapter portion coupled with the interface port and a connector portion removed from the interface port.
Figure 30:
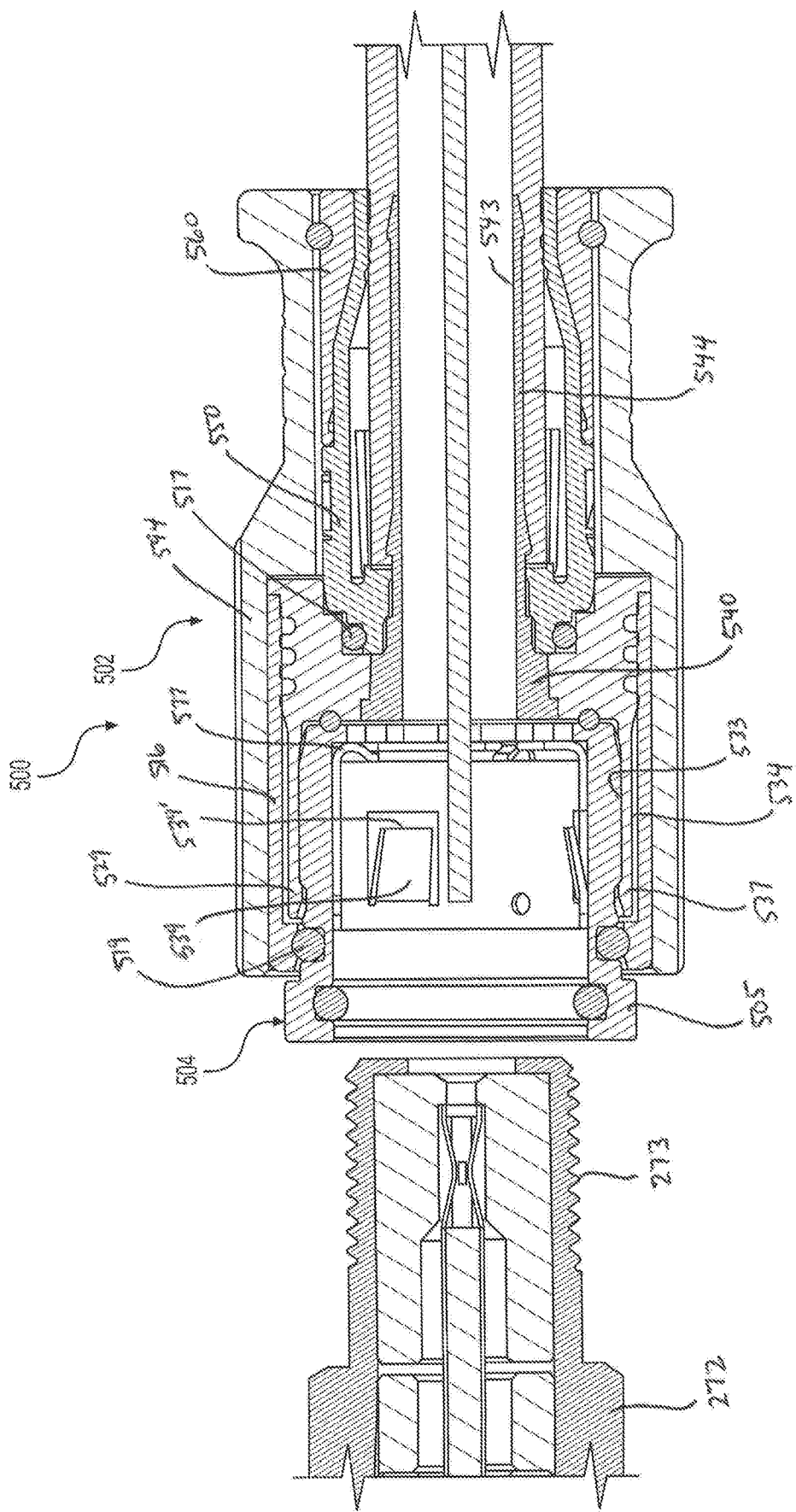
FIG. 30 is a cross-sectional view of the exemplary snap connector of FIG. 27.
Figure 31:
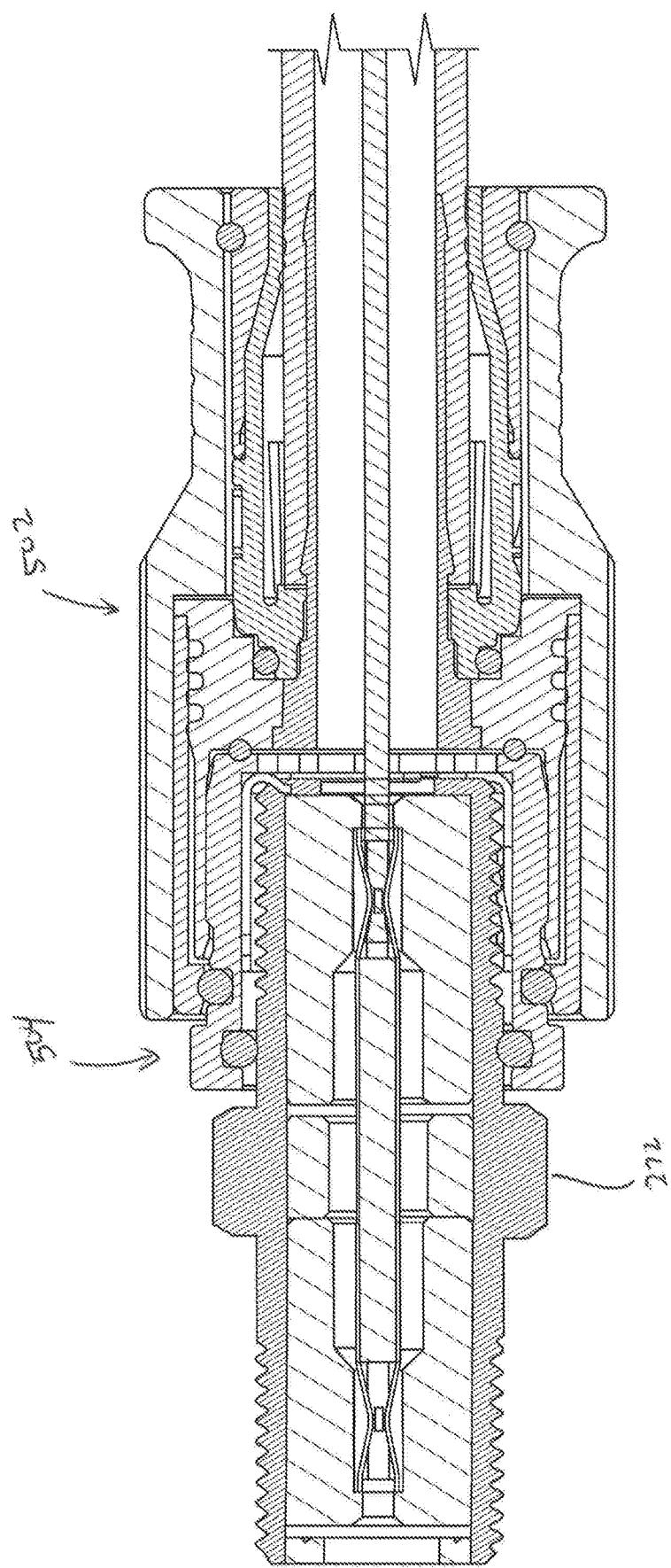
FIG. 31 is a cross-sectional, perspective view of the exemplary snap connector of FIG. 27 coupled with an interface port.
Figure 32:
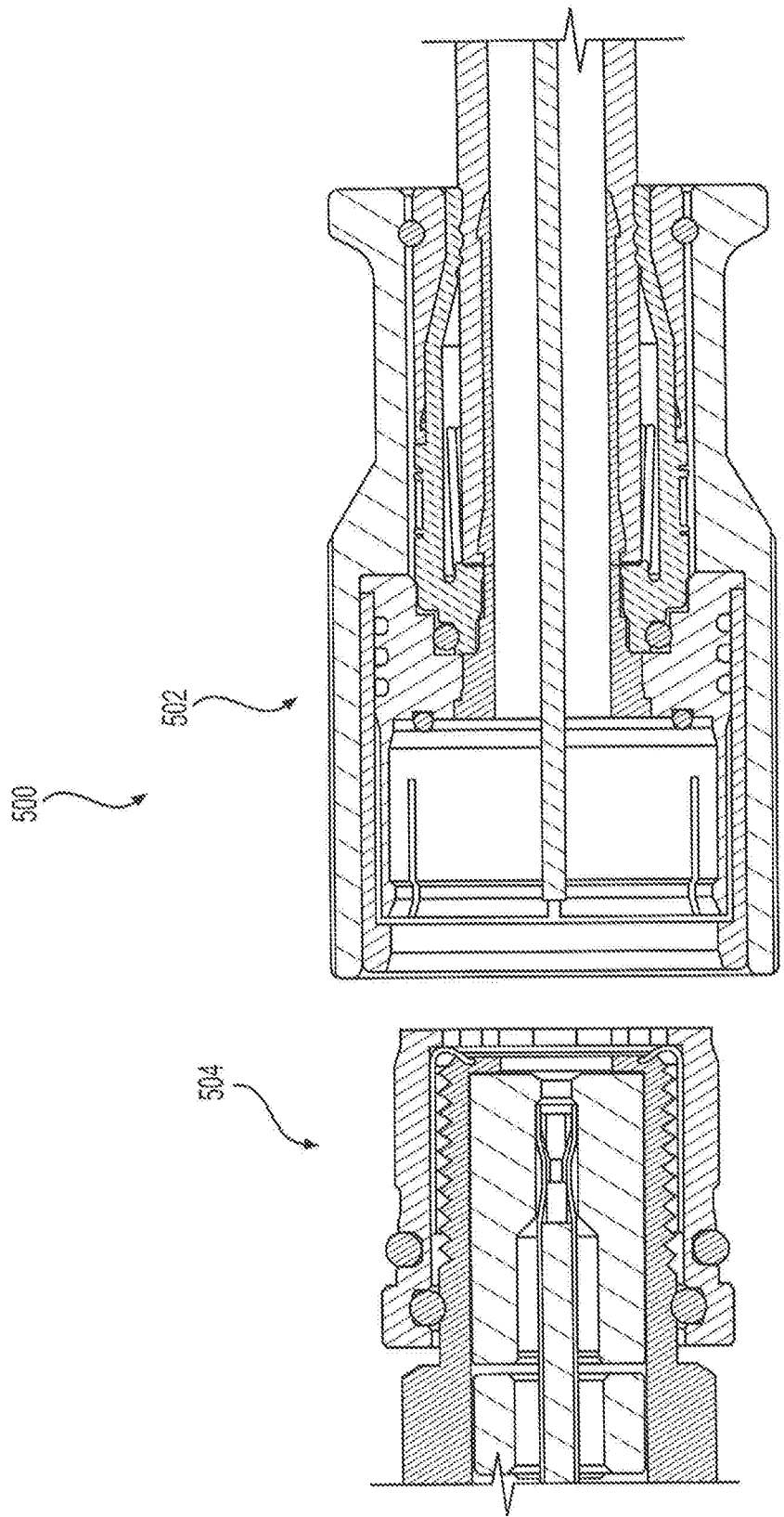
FIG. 32 is a cross-sectional view of the exemplary snap connector of FIG. 27 with an adapter portion coupled with the interface port and a connector portion removed from the interface port
Figure 33:
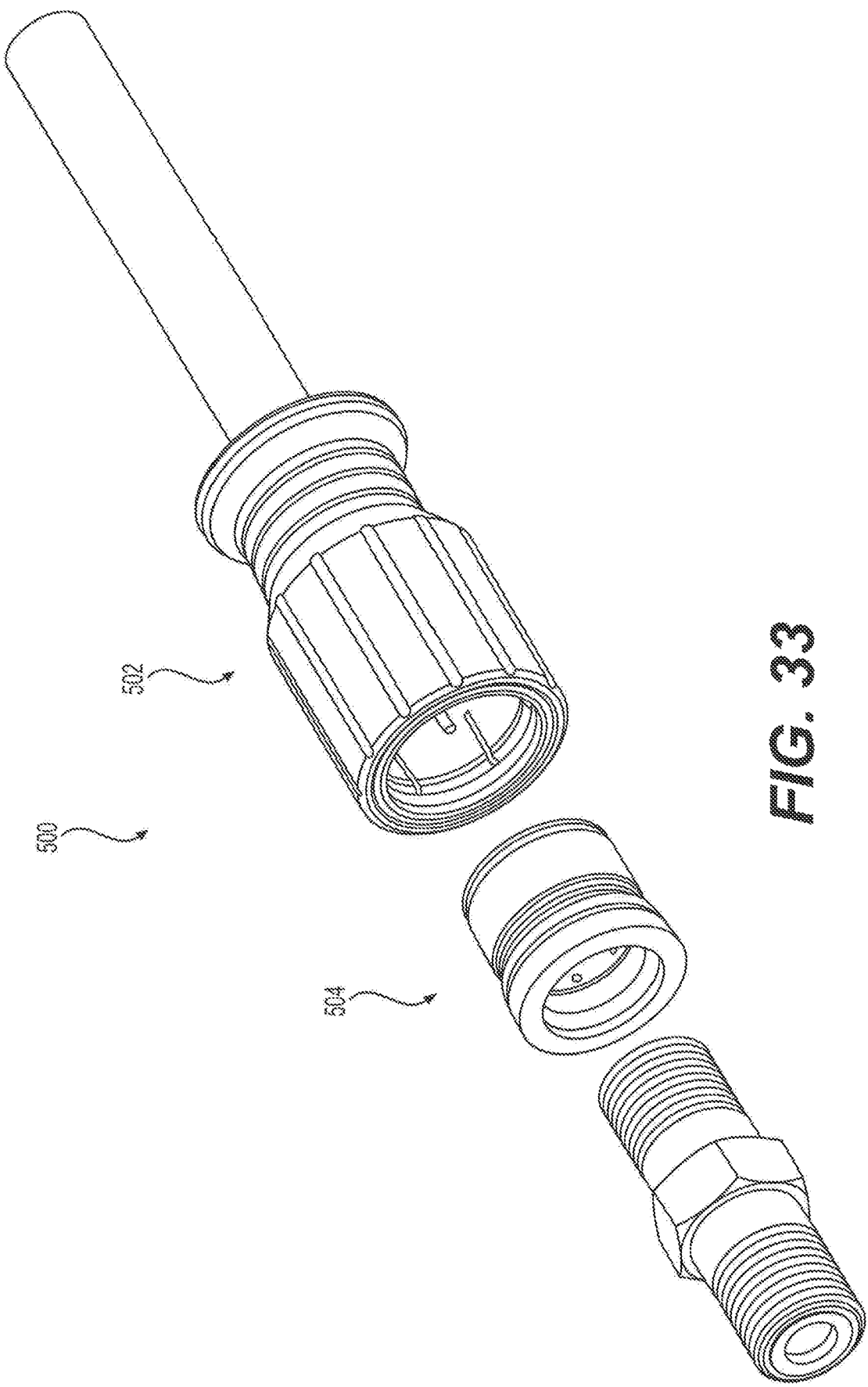
FIG. 33 is a perspective view of the exemplary connector of FIG. 27 with the adapter portion separated from the connector portion.

In use, the connector portion 302 and the adapter portion 304 are coupled to one another as discussed above and illustrated in FIGS. 11, 14, and 15. The connector 300, including the connector portion 302 and the adapter portion 304, is affixed to a prepared end of a coaxial cable 118. As shown in FIGS. 12 and 18, the connector 300 is then pushed onto an interface portion 282, which can be any standard female interface port, including an F81 connector, an F81 connector in a wall plate, a tap port on a tap, a splitter on a ground block, or the like. The adapter portion 302 is coupled with the interface port 372 via the resilient contact 339, and the force required to pull the adapter portion 304 off the interface port 372 is greater than the force required to decouple the connector portion 302 from the adapter portion 304 by pulling the connector portion 302. Thus, once the connector 300 is coupled with the interface port 372, the connector portion 302 can be removed from the adapter portion 304, thereby leaving the adapter portion 304 coupled with the interface port 372, as illustrated in the FIGS. 13, 16, 17, and 19.

Referring now to FIGS. 20-26, another exemplary connector 400 is illustrated and described. The connector 400 is similar to the connector 300 in having a connector portion 402 and an adapter portion 404, and the connector portion having a post 440, a coupling member 430, a connector body 450, and a fastener member 460. The post 440 is configured to receive a center conductor 44 surrounded by a dielectric 46 of a coaxial cable 118, the connector body 450 is attached to the post 440, and the coupling member 430 is attached to the post 440. The coupling member 430 has one or more flexible fingers 437 separated by axial slits, wherein the flexible fingers 437 are configured receive a rear portion of the adapter portion 404 by passing over the rear portion of the adapter portion 404 in a first axial direction. However, the connector portion 402 does not include an integral pin and dielectric insulator. Instead, the connector portion 402 is configured to receive the cable 118 in a pass-through arrangement.

The connector portion 402 may include a shroud 416, for example, a solid metal shroud, press fit to the coupling member 430. The shroud 416 may protect the flexible fingers 437 and improve shielding. The shroud 416 may also keep water out of the connector portion 402. In some aspects, the shroud 416 may be plastic.

The adapter portion 404 includes a body 405, an integral pin 407 surrounded by a dielectric insulator 408, which may be a resilient plastic. The integral pin 407 includes a rear socket 409 configured to receive the male pin 414 of the connector portion 402, and the pin 407 includes a male pin 411 at its forward end. The socket 409 and male pin 407 provide an electrical ground path extending from the center conductor 44 through the integral pin 410.

The flexible fingers 437 of the coupling member 430 may be configured to grip the adapter portion 404 via a retention structure 429 (e.g., a radially inward lip) that cooperates with a retention structure 406 (e.g., a circumferential groove) of a body 405 of the adapter portion 404. The connection between the connector portion 402 and the adapter portion 404 may be sealed by a seal member 419 between an inner surface of the shroud 416 and an outer surface of the body 405 of the adapter portion 404. The connector portion 402 may include a seal member 417 between the connector body 450 and the coupling member 430.

The adapter portion 404 includes a coupling portion 491 having at least one resilient contact 439 extending radially inward a distance from an inner surface 403 of the coupling portion 491. The resilient contact 439 is configured to provide a retention force, and at least one resilient protrusion 477 extends radially inward a distance from the inner surface 403 of the coupling portion 491. The resilient protrusion 477 is configured to contact a conductive surface of the body 405, as described above in connection with resilient protrusion 377 of connector 300.

The connector 400 may include a forward seal 496 coupled to the body 405 by a seal ring 497. The seal ring 497 may be knurled or the like to assist with removal of the adapter portion 404. The forward seal 496 may be conductive or non-conductive and is configured to provide a weathertight seal between the adapter portion 404 and the interface port 372. The forward seal 496 may be transparent or any degree of opaqueness. The connector 400 may also include an outer sheath 494 covering the connector portion 402 and a portion of the body 405 of the adapter portion 404. The outer sheath 494 may be non-conductive to protect a user from unexpected electrical current. The outer sheath 494 may be transparent or any degree of opaqueness.

However, in the connector 400, the adapter portion 404 includes a body 405, an integral pin 407 surrounded by a dielectric insulator 408, which may be a resilient plastic. The integral pin 407 includes a rear socket 409 configured to receive the center conductor 44 of the coaxial cable, and the pin 407 includes a male pin 411 at its forward end. The socket 409 and male pin 407 provide an electrical ground path extending directly from the center conductor 44. Otherwise, the use of the connector 400 and interaction between the connector portion 402, adapter portion 404, and interface port 372 is the same as that described above.

Referring now to FIGS. 27-33, another exemplary connector 500 is illustrated and described. The connector 500 is similar to the connector 300 in having a connector portion 502 and an adapter portion 504, and the connector portion having a post 540, a coupling member 530, a connector body 550, and a fastener member 560. The post 540 is configured to receive a center conductor 44 surrounded by a dielectric 46 of a coaxial cable 118, the connector body 550 is attached to the post 540, and the coupling member 530 is attached to the post 540. The coupling member 530 has one or more flexible fingers 537 separated by axial slits, wherein the flexible fingers 537 are configured receive a rear portion of the adapter portion 504 by passing over the rear portion of the adapter portion 504 in a first axial direction. However, the connector portion 502 does not include an integral pin and dielectric insulator. Instead, the connector portion 502 is configured to receive the cable 118 in a pass-through arrangement.

The connector portion 502 may include a shroud 516, for example, a solid metal shroud, press fit to the coupling member 530. The shroud 516 may protect the flexible fingers 537 and improve shielding. The shroud 516 may also keep water out of the connector portion 502. In some aspects, the shroud 516 may be plastic.

The flexible fingers 537 of the coupling member 530 may be configured to grip the adapter portion 504 via a retention structure 529 (e.g., a radially inward lip) that cooperates with a retention structure 506 (e.g., a circumferential groove) of a body 505 of the adapter portion 504. The connection between the connector portion 502 and the adapter portion 504 may be sealed by a seal member 519 between an inner surface of the shroud 516 and an outer surface of the body 505 of the adapter portion 504. The connector portion 502 may include a seal member 517 between the connector body 550 and the coupling member 530.

The adapter portion 504 includes a coupling portion 591 having at least one resilient contact 539 extending radially inward a distance from an inner surface 503 of the coupling portion 591. The resilient contact 539 is configured to provide a retention force, and at least one resilient protrusion 577 extends radially inward a distance from the inner surface 503 of the coupling portion 591. The resilient protrusion 577 is configured to contact a conductive surface of the body 505, as described above in connection with resilient protrusion 377 of connector 300.

The connector 500 may also include an outer sheath 594 covering the connector portion 502 and a portion of the body 505 of the adapter portion 504. The outer sheath 594 may be non-conductive to protect a user from unexpected electrical current. The outer sheath 594 may be transparent or any degree of opaqueness.

However, in the connector 500, the adapter portion 504 includes a body 505, but does not include an integral pin or a dielectric insulator. Instead, the adapter portion 502 is configured to receive the cable 118 in a pass-through arrangement that permits the center conductor to directly engage the interface port 372. Because of the pass-through configuration of the adapter portion, the connector 500 is somewhat larger in a radial direction than the connectors 300, 400. Otherwise, the use of the connector 500 and interaction between the connector portion 502, adapter portion 504, and interface portion 282 is the same as that described above.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A breakaway coaxial cable connector, comprising:
    a connector portion configured to be affixed to a prepared end of a coaxial cable; and
    an adapter portion configured to be removably coupled with the connector portion and slidingly coupled with an interface port;
    wherein the connector portion includes a first retention structure configured to be coupled with a second retention structure of the adapter portion at a first retention force,
    wherein the adapter portion includes a resilient contact configured to couple the adapter portion with the interface port at a second retention force while the adapter portion is coupled with the connector portion at the first retention force,
    wherein the second retention force is greater than the first retention force such that an axial tension force greater than the first retention force and less than the second retention force applied to the connector portion causes the first retention structure and the second retention structure to become uncoupled from one another such that the connector portion becomes uncoupled from the adapter portion, and
    wherein the resilient contact is configured to maintain the adapter portion coupled with the interface port when the axial tension force is applied to the connector portion.

2. The connector of claim 1, wherein the connector portion includes a post, a connector body, and a coupling member.

3. The connector of claim 1, wherein the resilient contact extends radially inward from an inner surface of the adapter portion.

4. The connector of claim 1, wherein the first retention structure includes flexible fingers having an internal annular lip, and the second retention structure includes a circumferential groove.

5. The connector of claim 1, wherein the connector portion and the adapter portion are configured to maintain electrical connectivity between the cable and the interface port when the connector portion and the adapter portion are coupled to one another and the adapter portion is coupled to the interface port.

6. A breakaway coaxial cable connector, comprising:
    a connector portion configured to be affixed to a prepared end of a coaxial cable; and
    an adapter portion configured to be removably coupled with the connector portion;
    wherein the adapter portion is configured to be coupled with the connector portion at a first retention force,
    wherein the adapter portion is configured to be slidingly coupled with an interface port at a second retention force while being coupled with the connector portion at the first retention force,
    wherein the second retention force is greater than the first retention force such that an axial tension force greater than the first retention force and less than the second retention force applied to the connector portion causes the connector portion to become uncoupled from the adapter portion, and
    wherein the adapter portion is configured to remain coupled with the interface port when the axial tension force is applied to the connector portion.

7. The connector of claim 6, wherein the connector portion includes a post, a connector body, and a coupling member.

8. The connector of claim 6, wherein the adapter portion includes a resilient contact that extends radially inward from an inner surface of the adapter portion and is configured to couple the adapter portion with the interface port.

9. The connector of claim 8, wherein the connector portion includes flexible fingers having an internal annular lip configured to engage a circumferential grooves of the adapter portion to couple the connector portion with the adapter portion.

10. The connector of claim 6, wherein the connector portion includes flexible fingers having an internal annular lip configured to engage a circumferential grooves of the adapter portion to couple the connector portion with the adapter portion.

11. The connector of claim 6, wherein the connector portion and the adapter portion are configured to maintain electrical connectivity between the cable and the interface port when the connector portion and the adapter portion are coupled to one another and the adapter portion is coupled to the interface port.

12. A breakaway coaxial cable connector, comprising:
a connector portion configured to be affixed to a prepared end of a coaxial cable; and
an adapter portion configured to be removably coupled with the connector portion;
wherein the adapter portion is configured to be slidingly coupled with an interface port while being coupled with the connector portion, and
wherein an axial tension force required to uncouple the connector portion from the adapter portion is less than an axial tension force required to uncouple the adapter portion from the interface port.

13. The connector of claim 12, wherein the adapter portion is configured to be coupled with the connector portion at a first retention force,
wherein the adapter portion is configured to be coupled with the interface port at a second retention force while being coupled with the connector portion at the first retention force, and
wherein the second retention force is greater than the first retention force.

14. The connector of claim 13, wherein the axial tension force is greater than the first retention force and less than the second retention force.

15. The connector of claim 12, wherein the adapter portion is configured to remain coupled with the interface port when the axial tension force is applied to the connector portion.

16. The connector of claim 12, wherein the connector portion includes a post, a connector body, and a coupling member.

17. The connector of claim 12, wherein the adapter portion includes a resilient contact that extends radially inward from an inner surface of the adapter portion and is configured to couple the adapter portion with the interface port.

18. The connector of claim 17, wherein the connector portion includes flexible fingers having an internal annular lip configured to engage a circumferential grooves of the adapter portion to couple the connector portion with the adapter portion.

19. The connector of claim 12, wherein the connector portion includes flexible fingers having an internal annular lip configured to engage a circumferential grooves of the adapter portion to couple the connector portion with the adapter portion.

20. The connector of claim 12, wherein the connector portion and the adapter portion are configured to maintain electrical connectivity between the cable and the interface port when the connector portion and the adapter portion are coupled to one another and the adapter portion is coupled to the interface port.

* * * * *